United States Patent
Haigh-Hutchinson

(10) Patent No.: US 9,339,724 B2
(45) Date of Patent: May 17, 2016

(54) METHOD AND APPARATUS FOR USING A COMMON POINTING INPUT TO CONTROL 3D VIEWPOINT AND OBJECT TARGETING

(75) Inventor: Mark Haigh-Hutchinson, Austin, TX (US)

(73) Assignee: NINTENDO CO., LTD., Kyoto (JP)

( * ) Notice: Subject to any disclaimer, the term of this patent is extended or adjusted under 35 U.S.C. 154(b) by 81 days.

(21) Appl. No.: 13/595,760

(22) Filed: Aug. 27, 2012

(65) Prior Publication Data

US 2012/0329558 A1    Dec. 27, 2012

Related U.S. Application Data

(63) Continuation of application No. 11/531,961, filed on Sep. 14, 2006, now Pat. No. 8,277,316.

(51) Int. Cl.
*A63F 13/00* (2014.01)
*A63F 13/219* (2014.01)

(52) U.S. Cl.
CPC ......... *A63F 13/04* (2013.01); *A63F 2300/6676* (2013.01); *A63F 2300/8076* (2013.01)

(58) Field of Classification Search
USPC ......................................... 463/30, 31, 32, 40
See application file for complete search history.

(56) References Cited

U.S. PATENT DOCUMENTS

| | | |
|---|---|---|
| 4,720,703 A | 1/1988 | Schnarel et al. |
| 5,075,673 A | 12/1991 | Yanker |
| 6,097,371 A | 8/2000 | Siddiqui et al. |
| 6,097,387 A | 8/2000 | Sciammarella et al. |
| 6,165,073 A | 12/2000 | Miyamoto |
| 6,241,609 B1 | 6/2001 | Rutgers |
| 6,259,431 B1 | 7/2001 | Futatsugi et al. |
| 6,314,426 B1 | 11/2001 | Martin et al. |
| 6,354,944 B1 | 3/2002 | Takahashi et al. |
| 6,500,069 B1 | 12/2002 | Ohba et al. |
| 6,626,760 B1 | 9/2003 | Miyamoto et al. |
| 6,835,136 B2 | 12/2004 | Kitao |
| 6,972,776 B2 | 12/2005 | Davis et al. |
| 7,071,919 B2 | 7/2006 | Hinckley et al. |
| 7,281,982 B2 * | 10/2007 | Aonuma ........................ 463/32 |

(Continued)

FOREIGN PATENT DOCUMENTS

JP    116343    9/1995

OTHER PUBLICATIONS

U.S. Appl. No. 12/222,873, to Haigh-Hutchinson, filed Aug. 18, 2008.

(Continued)

*Primary Examiner* — Paul A D'Agostino
*Assistant Examiner* — Brandon Gray
(74) *Attorney, Agent, or Firm* — Nixon & Vanderhye P.C.

(57) ABSTRACT

A computer graphics display system such as a video game system provides virtual camera 3-D viewpoint panning control based on a pointer. When the pointer is displayed within a virtual camera panning control region, the system automatically pans the virtual camera toward the pointer. When the pointer is displayed within a different region, panning is deactivated and the user can freely move the cursor (e.g., to control the direction a weapon is pointed) without panning the virtual camera viewpoint. Flexible viewpoint control and other animated features are provided based on a pointing device such as a handheld video game optical pointing control. Useful applications include but are not limited to first person shooter type video games.

21 Claims, 17 Drawing Sheets

(56) References Cited

U.S. PATENT DOCUMENTS

| | | |
|---|---|---|
| 2003/0169280 A1 | 9/2003 | Hsieh |
| 2004/0110560 A1 | 6/2004 | Aonuma |
| 2004/0224760 A1 | 11/2004 | Miyamoto et al. |
| 2005/0049047 A1* | 3/2005 | Kitao ............................. 463/33 |
| 2005/0225559 A1* | 10/2005 | Robertson et al. ............ 345/581 |
| 2006/0048073 A1 | 3/2006 | Jarrett et al. |
| 2006/0084509 A1 | 4/2006 | Novak et al. |
| 2006/0094502 A1* | 5/2006 | Katayama et al. .............. 463/31 |
| 2006/0246968 A1 | 11/2006 | Dyke-Wells |
| 2007/0097150 A1 | 5/2007 | Ivashin et al. |
| 2007/0109300 A1* | 5/2007 | Li ................................ 345/427 |
| 2007/0155492 A1 | 7/2007 | Goden et al. |
| 2007/0270215 A1 | 11/2007 | Miyamoto et al. |
| 2007/0298881 A1 | 12/2007 | Kawamura et al. |

OTHER PUBLICATIONS

Zeleznik et al. "UniCam—2D Gestural Camera Controls for 3D Environments," Proceedings of ACM I3D '99, 1999 Symposium on Interactive 3D Graphics, Atlanta, GA, USA, pp. 169-173 (1999).
McKenna, "Interactive Viewpoint Control and Three-Dimensional Operations," Proceedings of the 1992 Symposium on Interactive 3D graphics, 1992 ACM, pp. 53-56, Association for Computing Machinery, Cambridge MA (1992).
Mohageg et al., A User Interface for Accessing 3D Content on the World Wide Web, CHI 96 Vancouver, BC Canada, pp. 466-472 (Apr. 13-18, 1996).
Cozic et al., "Intuitive Interaction and Expressive Cinematography in Video Games," Theory and Practice of Computer Graphics 2004 (TPCG 2004), Birmingham, UK. IEEE Computer Society 2004, pp. 135-142 (Jun. 8-10, 2004).
MacKinlay et al., "Rapid Controlled Movement Through a Virtual 3D Workspace," Computer Graphics, vol. 24, No. 4, pp. 171-176 (Aug. 1990).
Hinckley, "Input Technologies and Techniques," in Handbook of Human-Computer Interaction ed. by A. Sears & J. Jacko, pp. 1-65 (2002).
Square Enix Official Strategy Guide, Kingdom Hearts II, (PlayStation 2 version) Shueisha Inc., First issue pp. 009-011 (Dec. 27, 2005).
Kingdom Hearts II, instruction manual, Square Enix, pp. 1-14 (Dec. 22, 2005).
Kingdom Hearts II, US Release as evidenced by http://en.wikipedia.org/wiki/Kingdom_Hearts_11, pp. 1-11 (Retrieved Oct. 22, 2013).
CD-ROM Fan, Online Player, Mainichi Communications Inc., 1:122-123 (Nov. 8, 2001).

* cited by examiner

NON-LIMITING
EXAMPLE GAME SYSTEM

NON-LIMITING EXAMPLE CONTROLLER

NON-LIMITING EXAMPLE CONTROLLER

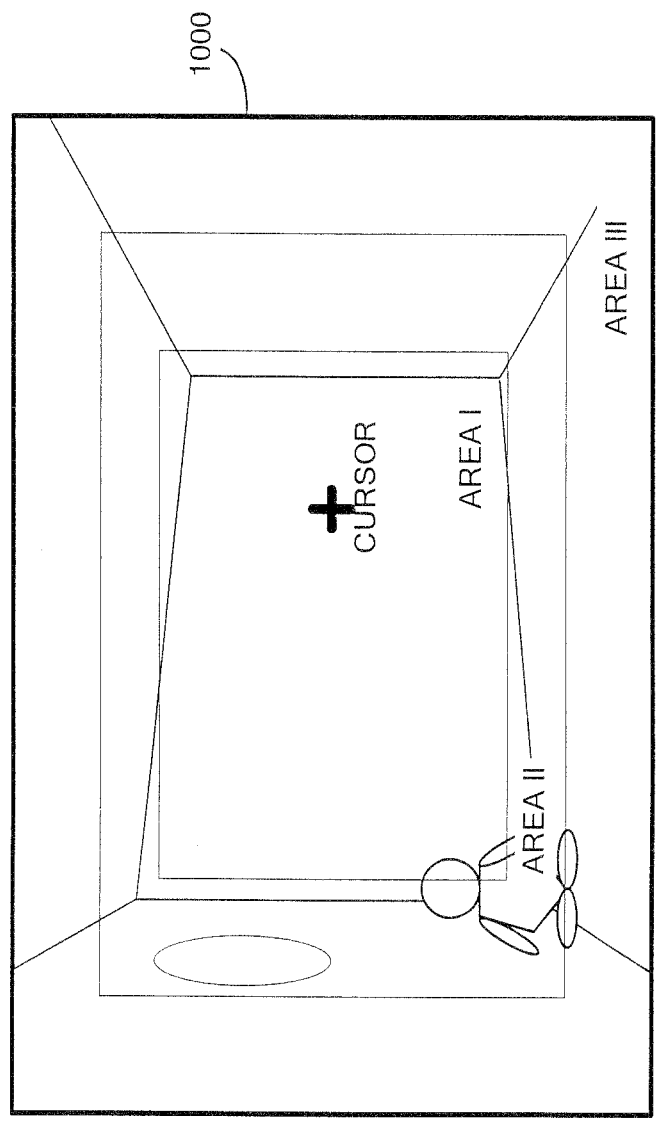

METHOD AND APPARATUS FOR USING A COMMON POINTING INPUT TO CONTROL 3D VIEWPOINT AND OBJECT TARGETING

This application is a continuation of application Ser. No. 11/531,961, filed Sep. 14, 2006, now allowed, the entire contents of which are hereby incorporated by reference.

FIELD

The technology herein relates to three-dimensional computer graphics, and more particularly to techniques for controlling a 3D viewpoint within a virtual three-dimensional space. Still more specifically, the technology herein provides method, apparatus and techniques for using a common pointing indication or control to control both video game action such as object targeting and virtual camera viewing direction/panning.

BACKGROUND AND SUMMARY

Many 3D games and other graphical displays allow the user some flexibility in changing the viewpoint from which the 3D virtual world is viewed. Just like the way authors write novels in different voices, video games can be created to view a three-dimensional virtual world from either a "third person viewpoint" or a "first person viewpoint." In "third person viewpoint" games, a virtual camera is located within the three-dimensional space at a position from which the game player can see and hear all of the action. "First person viewpoint" games show the action from the viewpoint of a character within the game space who is interacting with other objects and events in the game. Each type of presentation has its advantages. Some games allow the game player to switch between a first person viewpoint and a third person viewpoint.

Some of the more popular first person viewpoint games place the game player at the viewpoint of a combatant in some type of conflict. For example, the game player may see the three-dimensional world through the eyes of a soldier or warrior whose job is to attack and destroy enemies such as for example alien creatures who have invaded a virtual spaceship. Using such first person viewpoint display techniques can create an immersive game play action in which the game player feels as if he or she is within the game.

Some prior first person viewpoint display techniques locate a "virtual camera" within the three-dimensional virtual world at a position corresponding to the head of a game character in the game. Objects within the three-dimensional world are rendered from the perspective of this virtual camera. Just like in the real world, a user can turn his or her head to the left or right or look up or down to see different parts of the virtual world. Changing the direction the virtual camera is aimed reveals different parts of the 3-D world, allowing the game player to "look around" the virtual landscape.

In contexts such as virtual tours of buildings and landscapes, users can change a virtual 3-D camera viewpoint via a web browser and a plug-in such as QuickTime® or Flash® to view a scene from a variety of different viewpoints by moving a mouse controlling a cursor. Many video and computer games allow the game player to operate a pointing control such as a joystick to scroll or otherwise change the virtual camera's viewpoint. Thus, when the user moves the joystick to the right of the image, the display also scrolls or pans to the right of the virtual 3-D world and a player to reveal objects previously out of view.

There have been a number of games for personal computers, arcade games and home video game platforms designed to operate primarily in response to two-dimensional cursor control signals from a mouse, joystick, touchpad or other 2-D directional input device(s). For example, it is common for a combination of a mouse and a keyboard to provide inputs for playing first-person shooter games. In many such games, the X axis of the mouse is used for looking (or turning) left and right, while the Y axis is used for looking up and down.

In such games, the left mouse button is sometimes used to control weapon firing. In many video and computer games, a second joystick or other control is used to control other aspects of game action including for example where a weapon is pointed (i.e., object targeting). Still other controls can be used to control weapon firing or other events.

While traditional arcade and home video games have often provided game players with a range of different handheld controls including single or dual joysticks, push buttons, cross-switches and the like to provide simultaneous control over 3D viewpoint and object/weapon targeting, some new gaming platforms have streamlined and simplified the user interface. For example, Nintendo's WHO home video game system provides a handheld pointing device. The user may point the handheld device at the screen or in other directions. Using optical and/or accelerometer sensors, the Wii game system can detect automatically the direction in which the user is pointing the pointing device, and use this direction as an input to control aspects of video game play. The pointing device can be used to control the position of objects such as (but not limited to) a cursor on the display. Positioning the cursor over an enemy can cause a game character to automatically aim his or her weapon at that enemy. Pressing a "fire" button can then control the game character to fire the weapon at the enemy. It is also possible to control a wide variety of other applications including driving games, flight simulators, adventure games, web browsing, puzzle games, text input and the like.

Other video game platforms use touch screens to control game action. The Nintendo DS portable video game system is one such example. In addition to the normal cross switch or other thumb or finger operated buttons, the Nintendo DS includes a touch screen that can be actuated by the position of a finger or stylus above a display. Some games use the stylus or finger position to control game play action. For example, touching the stylus onto an enemy could cause the game character to aim a weapon at the enemy. Pushing a button or, in some games, leaving the stylus in contact with the image of the enemy for a sufficient period of time could cause a weapon to fire at the enemy. A wide variety of other applications are also possible.

While such simplified user interfaces have many advantages and are highly flexible, they also present some challenges. For example, game players who are used to playing first person viewpoint games on certain platforms have become accustomed to controlling game action with one joystick and controlling viewpoint with a second joystick. In platforms providing a single pointing device, dual pointing or joystick control is not necessarily or always available. While it is possible to choose between a viewpoint control mode and a weapon targeting or other game action control mode, game developers strive for as much realism as possible. In the real world, a person can move his or her head to look at different parts of surroundings at the same time he or she manipulates objects such as aiming a weapon held in the hands. It would be desirable to realistically duplicate these types of real world capabilities through the mechanism of a single pointing device such as an optical pointer and/or accelerometer type sensor.

The technology herein provides an exemplary illustrative non-limiting way to minimize the complexity of user inputs while conveniently allowing the user to control virtual camera panning and other game play action via a common pointing action. Exemplary illustrative non-limiting technology herein allows a player to conveniently control both targeting or other game player character interaction and 3-D viewpoint direction with a common cursor or other pointing action or indicator. To allow a cursor or pointing action to control both a 3-D camera direction and game play targeting within a 3-D video game or other 3-D computer graphics presentation, one exemplary illustrative non-limiting implementation divides the screen into plural zones or regions. In one exemplary illustrative non-limiting implementation, moving the cursor anywhere within a "dead zone" may for example control interaction with video game characters or other objects (e.g., for purposes of weapon targeting or other effects) but does not cause the 3-D camera angle to change. When the cursor is moved outside the "dead zone", the 3-D camera may change in a predictable and controllable way such as by panning in a direction corresponding to cursor position and/or change in cursor position, and a weapon or other aspect of game play can at the same time continue to make use of the pointing indication for targeting or other purposes.

In one exemplary illustrative non-limiting implementation, the game player can use the same pointing control to control the direction and/or manner of 3D viewpoint changes. For example, the game player can control how fast the 3-D camera pans depends on where the cursor is located on the display. In one exemplary illustrative non-limiting implementation, the 3-D camera pans rapidly when the cursor is in a first zone and pans more slowly when the cursor is in a second zone.

By way of example, without limitation, one exemplary implementation can provide a variable rate of camera angle change based on time encoding. For example, the virtual camera angle can change slowly over an initial period during which a cursor is positioned within a predetermined area of a display and/or 3-D world. The camera angle can change more rapidly after the cursor has been within the predetermined area of the display and/or 3-D world for more than a certain time threshold. Multiple timing thresholds can be applied as desired.

Exemplary illustrative non-limiting advantages include:
Ability to change a targeting reticle on screen independent of camera movement
No need to choose between weapon targeting and viewpoint change
Same pointing control can control both 3D viewpoint and weapon or other targeting
Unobtrusive mode in which pointing control controls only targeting and 3D viewpoint remains unaffected
3D viewpoint panning speed can depend on where the user has positioned a cursor on the screen
customizable sensitivity (so user can program viewpoint change/panning rate)
single joystick or other pointing indicator can be used to control both 3D viewpoint and object targeting.

Technology herein thus provides, by way of example without limitation, a method of controlling three-dimensional viewpoint panning within a computer graphics display system comprising predefining first and second regions on a display, said first region corresponding to a panning control region, said second region corresponding to a region that does not control panning; displaying a pointing indicia on said display at a position that is at least in part responsive to a user input; and panning the 3-D viewpoint whenever the user positions the cursor within the first region but not when the user positions the cursor within the second region.

The first region can at least in part surrounds the second region.

One can control the rate of panning at least in part in response to the distance the user positions the cursor relative to a center point of the display.

One can control the rate of panning based at least in part on how long the user positions the cursor within the first region.

One may subdivide said first region into plural virtual camera control regions, and control the rate of virtual camera panning based at least in part on which of said plural regions the user positions the cursor within.

One may display a mask image, wherein said mask image at least in part comprises said second region.

One may automatically animate the position of a weapon to aim at cursor-indicated objects.

The weapon can be animated to follow cursor position at the same time as cursor position controls whether or not to pan.

One may control the direction of 3-D pan based at least in part on the position of the cursor relative to a reference point such as the center of the display.

Exemplary illustrative non-limiting technology herein also provides a system for providing an animated display comprising: a display device that displays an image subdivided into plural regions; a cursor control that displays a cursor on said display device; a user input device coupled to said cursor control, said user input device determining the position said cursor is displayed on said display device; and panning control that selectively pans a 3-D viewpoint at least in part defining said image conditioned on which of said regions said cursor is displayed within.

Exemplary illustrative non-limiting technology herein also provides a storage device storing: data at least in part defining a model of a three-dimensional world; a first code segment that subdivides a display region into at least first and second predetermined regions; a second code segment that at least in part controls the position an object is displayed in response to user inputs; and a third code segment that controls panning of a virtual camera 3-D viewpoint to selectively activate 3-D viewpoint panning whenever said object is displayed within a first region and selectively deactivates 3-D viewpoint panning whenever said object is displayed within a second region different from said first region.

BRIEF DESCRIPTION OF THE DRAWINGS

These and other features and advantages of exemplary illustrative non-limiting implementations will be better and more completely understood by referring to the following detailed description in conjunction with the drawings, of which:

FIG. 6A shows different exemplary illustrative effects that an exemplary illustrative non-limiting implementation provides as the cursor moves into different panning control regions;

DETAILED DESCRIPTION

Exemplary Video Game Platform

Figure 1:
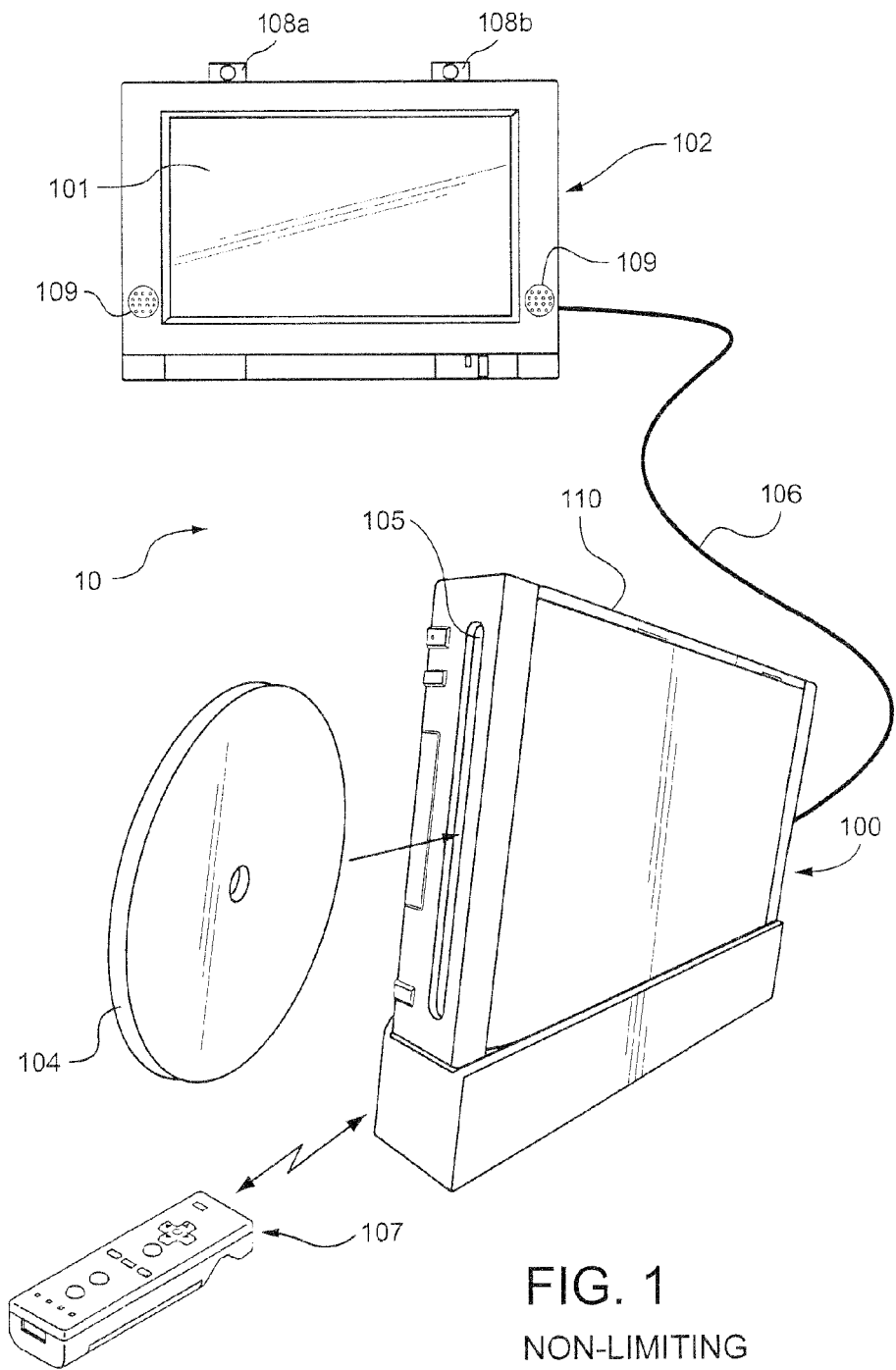
FIG. 1 shows an exemplary external view of a non-limiting interactive computer graphics system in the form of a home video game apparatus for executing a game program.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display 101 of television 102 to which game console 100 is connected by cable 106. Audio associated with the game program or other application is output via speakers 109 of television 102. While an optical disk is shown in FIG. 1 for use in storing video game software, the game program or other application may alternatively or additionally be stored on other storage media such as semiconductor memories, magneto-optical memories, magnetic memories and the like and/or downloaded over a network or by other means.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Preferably, a center point between light-emitting devices 108a and 108b is aligned with a vertical center line of television 101. The images from light-emitting devices 108a and 108b can be used to determine a direction in which controller 107 is pointing as well as a distance of controller 107 from display 101. By way of example without limitation, light-emitting devices 108a and 108b may be implemented as two LED modules (hereinafter, referred to as "markers") provided in the vicinity of a display screen of television 102. The markers each output infrared light and the imaging information calculation section of controller 107 detects the light output from the LED modules to determine a direction in which controller 107 is pointing and a distance of controller 107 from display 101 as mentioned above. As will become apparent from the description below, various implementations of the system and method for simulating the striking of an object described herein do not require use such markers.

Although markers 108a and 108b are shown in FIG. 1 as being above television 100, they may also be positioned below television 100 or in other configurations.

Figure 2:
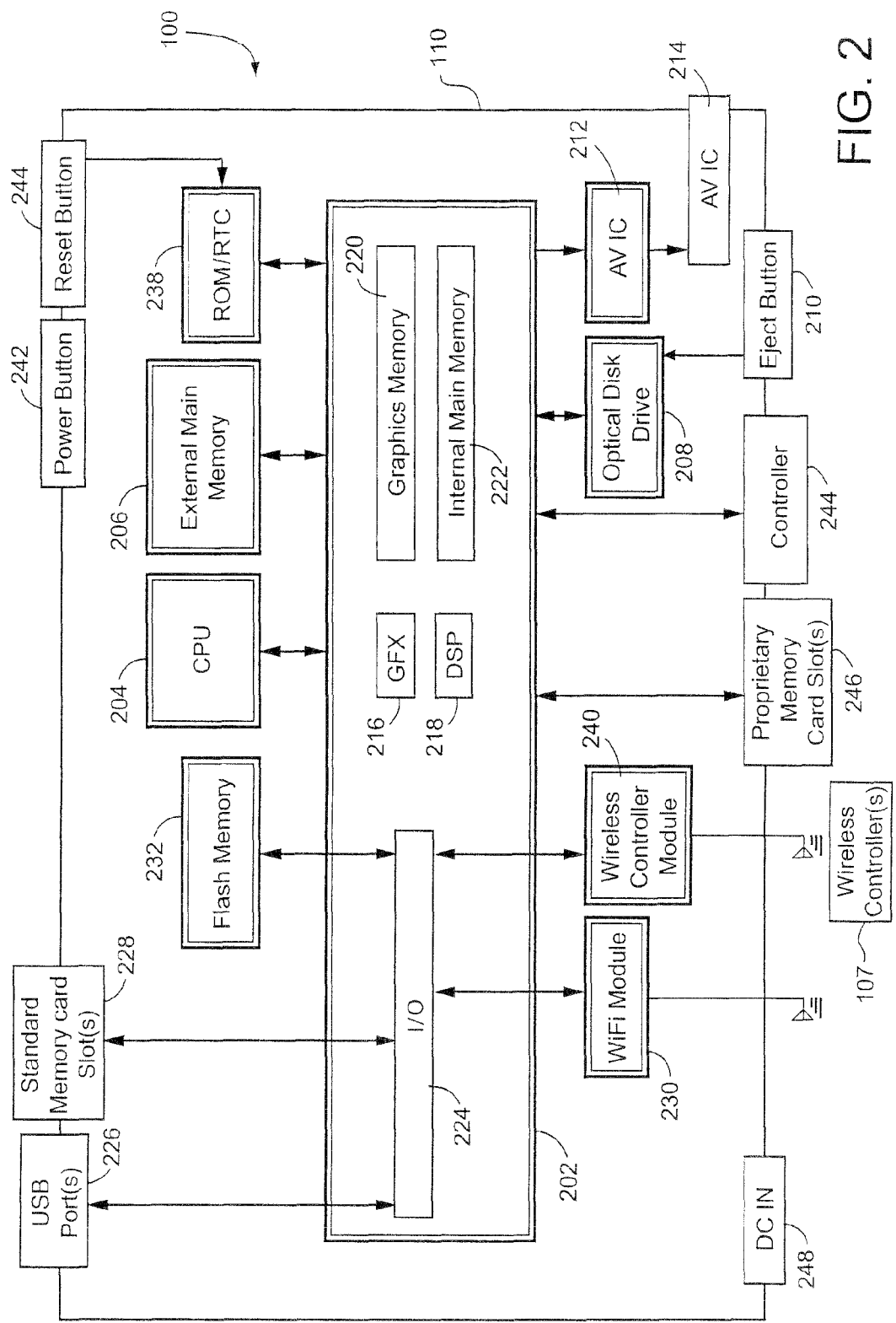
FIG. 2 is a block diagram showing an internal structure of the game apparatus.

With reference to the block diagram of FIG. 2, game console 100 includes a RISC central processing unit (CPU) 204 for executing various types of applications including (but not limited to) video game programs. CPU 204 executes a boot program stored in a boot ROM (not shown) to initialize game console 100 and then executes an application (or applications) stored on optical disc 104 which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed for execution by CPU 204 and graphics processor 216 and optical disks of a second type (e.g., of a second size and/or a second data structure) containing applications originally developed for execution by a different CPU and/or graphics processor. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module may also be used for communication with other game devices such as suitably-equipped hand-held game devices. Module 230 is referred to herein as "WiFi", which is generally used in connection with the family of IEEE 802.11 specifications. However, game console 100 may of course alternatively or additionally use wireless modules that conform with other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected to controller 107 and controller 107 could transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry. By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the consoled off so as to reduce the possibility of inadvertently turn-off. Reset button 244 is used to reset (re-boot) game console 100.

Figure 3A:
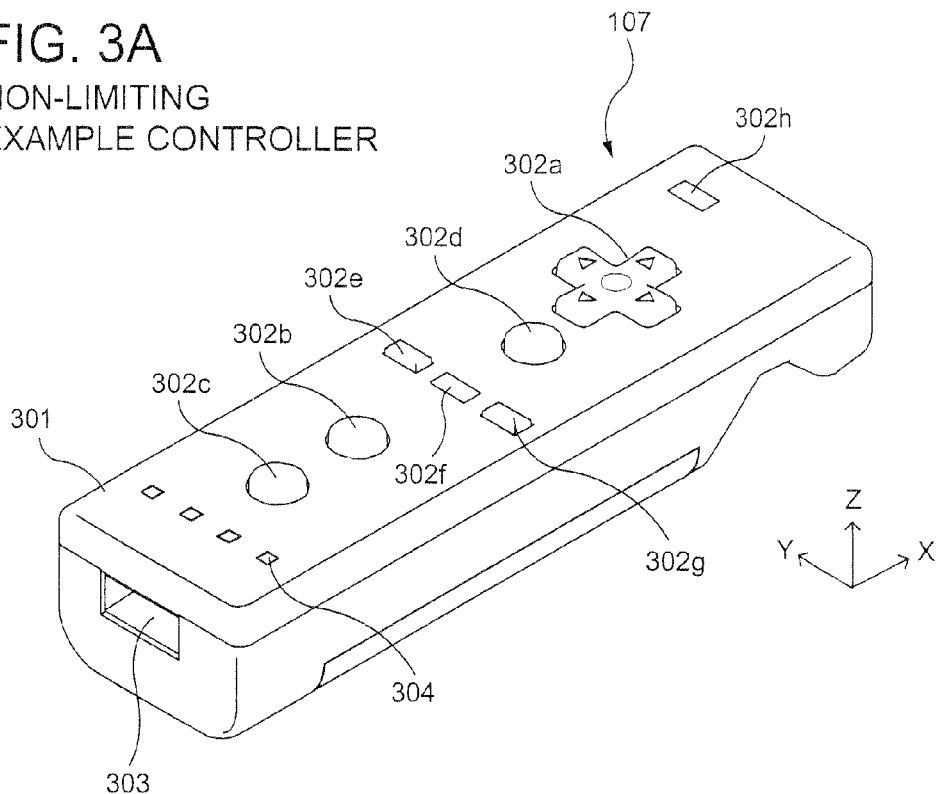
FIGS. 3A, 3B and 4 show different views of an exemplary illustrative non-limiting handheld controller for the video game system of FIG. 1.
Figure 3B:
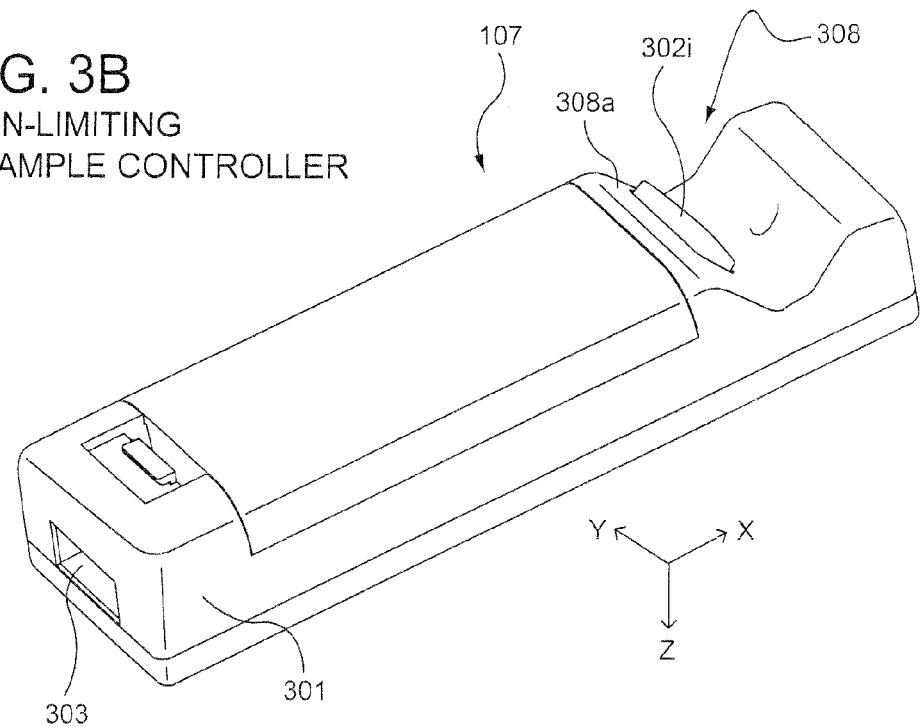
Figure 4:
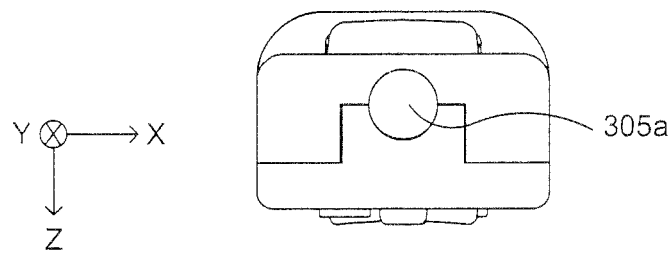

With reference to FIGS. 3 and 4, example controller 107 includes a housing 301 on which operating controls 302a-302h are provided. Housing 301 has a generally parallelepiped shape and is sized to be conveniently holdable in a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player may be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from the other controllers used with game console 100 and LEDs may 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of an imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. The techniques described herein of simulating the striking of an object can be achieved without using information from imaging information calculation section 305, and thus further detailed description of the operation of this section is omitted. Additional details may be found in Application Nos. 60/716,937, entitled "VIDEO GAME SYSTEM WITH WIRELESS MODULAR HANDHELD CONTROLLER," filed on Sep. 15, 2005; 60/732,648, entitled "INFORMATION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5:
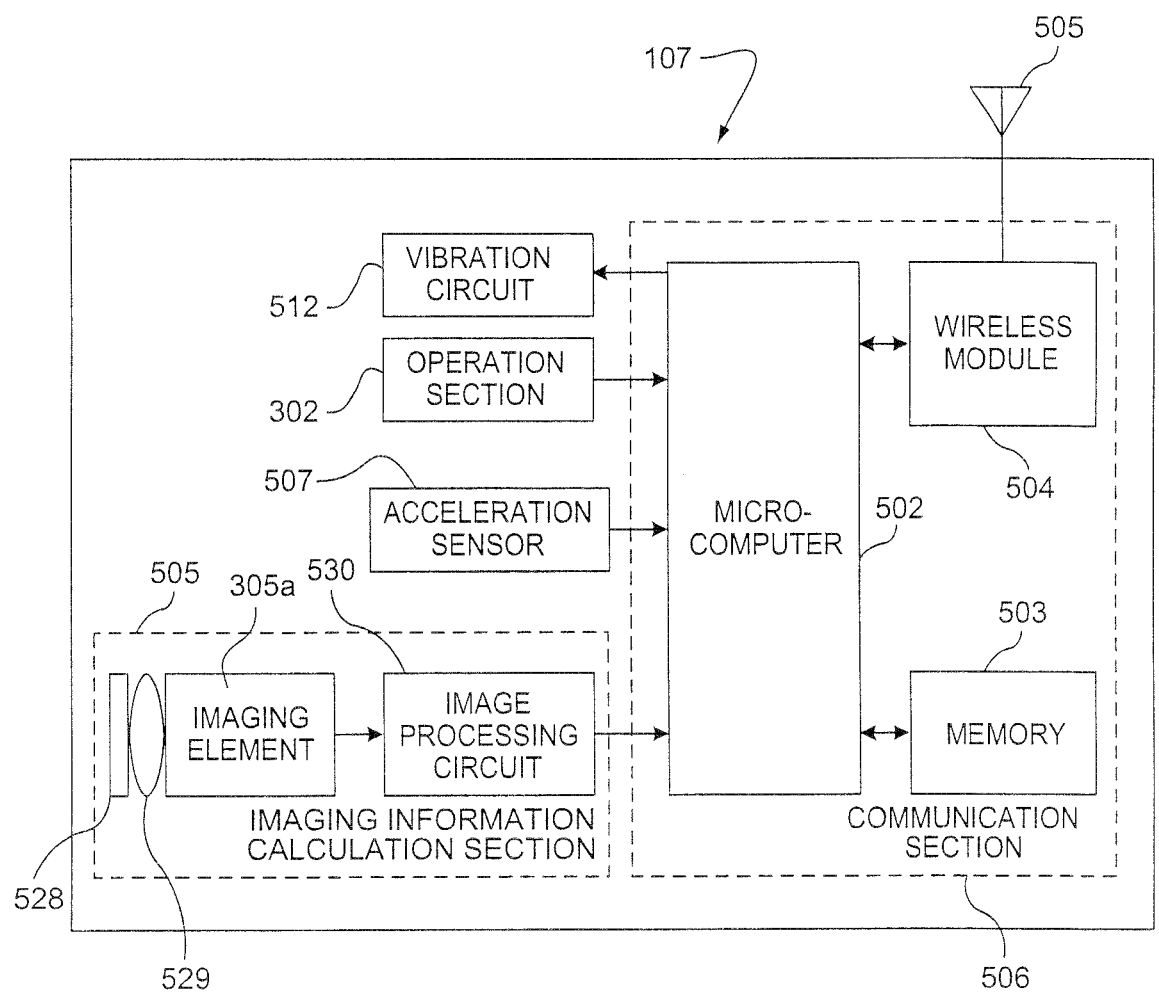
FIG. 5 is a block diagram of an exemplary illustrative non-limiting implementation of the handheld controller.

As shown in the block diagram of FIG. 5, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis may be used or a one-axis linear accelerometer that only detects linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, image information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player holding controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at a predetermined time interval. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

The exemplary illustrative non-limiting system described above can be used to execute software stored on optical disk 104 or in other memory that controls it to interactive generate displays on display 101 of a progressively deformed object in response to user input provided via controller 107. Exemplary illustrative non-limiting software controlled techniques for generating such displays will now be described.

Example Illustrative Non-Limiting Pointing Control

Figure 6:
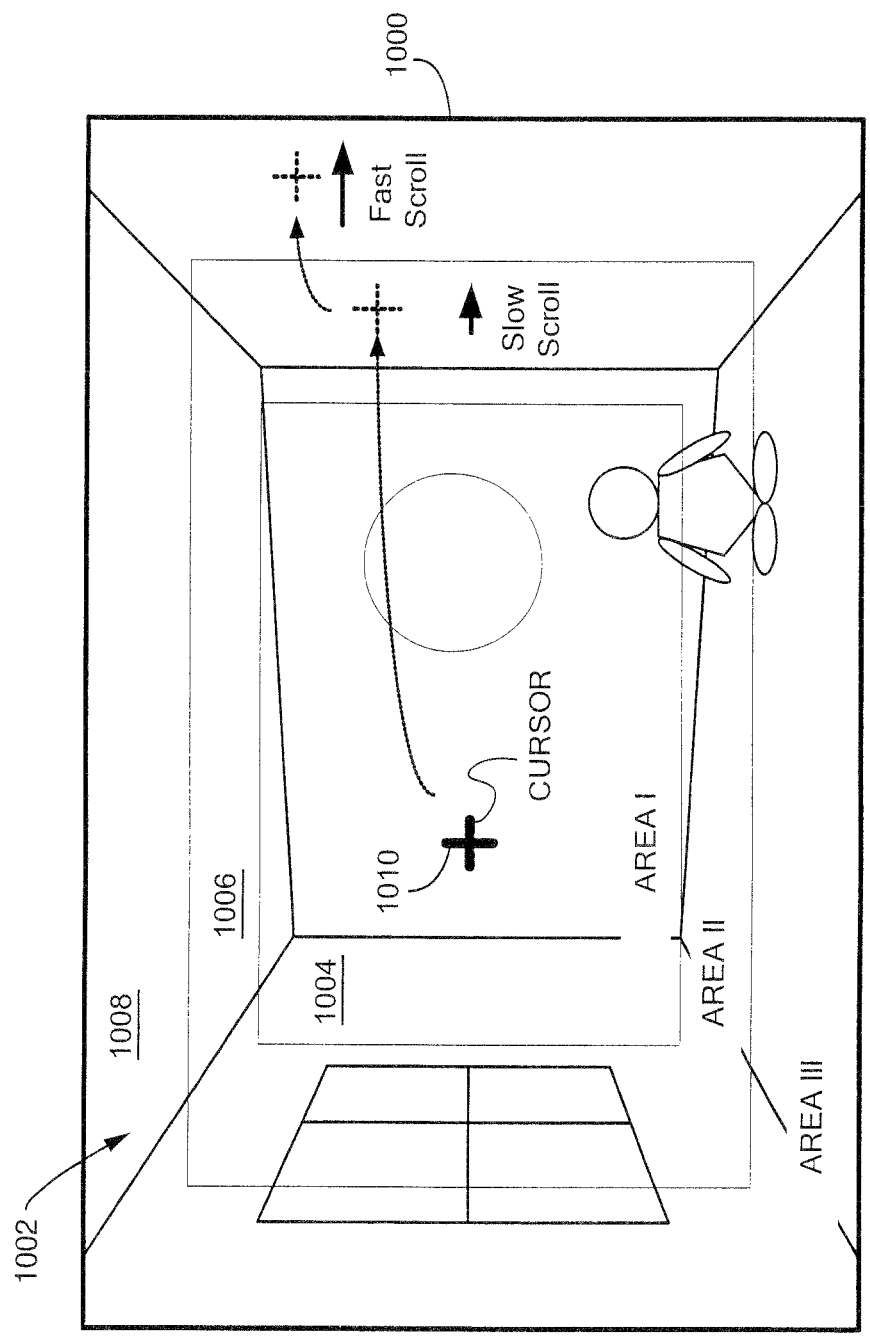
FIG. 6 is a schematic illustration of an exemplary illustrative non-limiting screen display showing camera panning control regions.
Figure 7B:
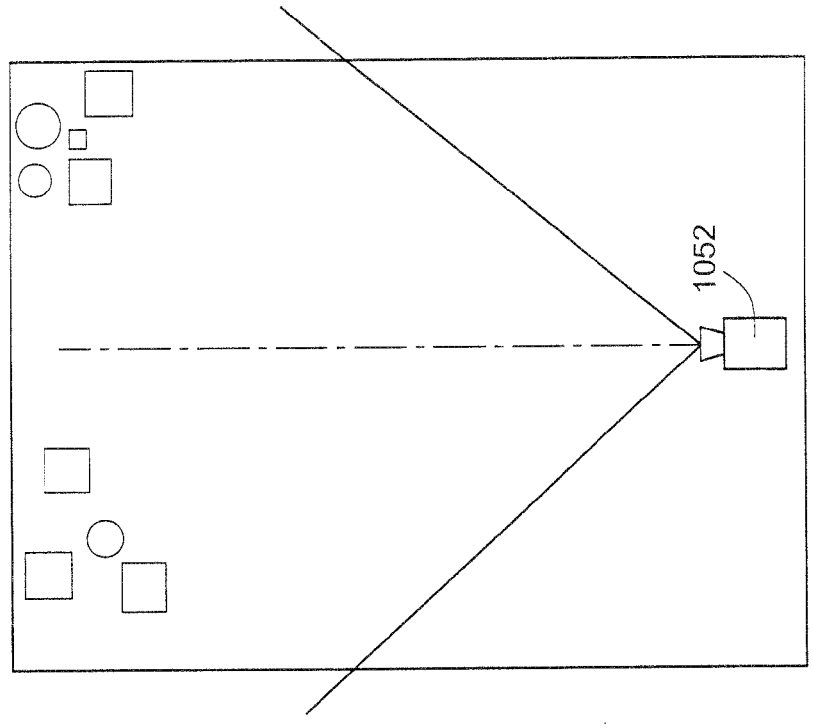
FIGS. 7A-7D show an exemplary cursor position and associated virtual camera views.
Figure 7A:
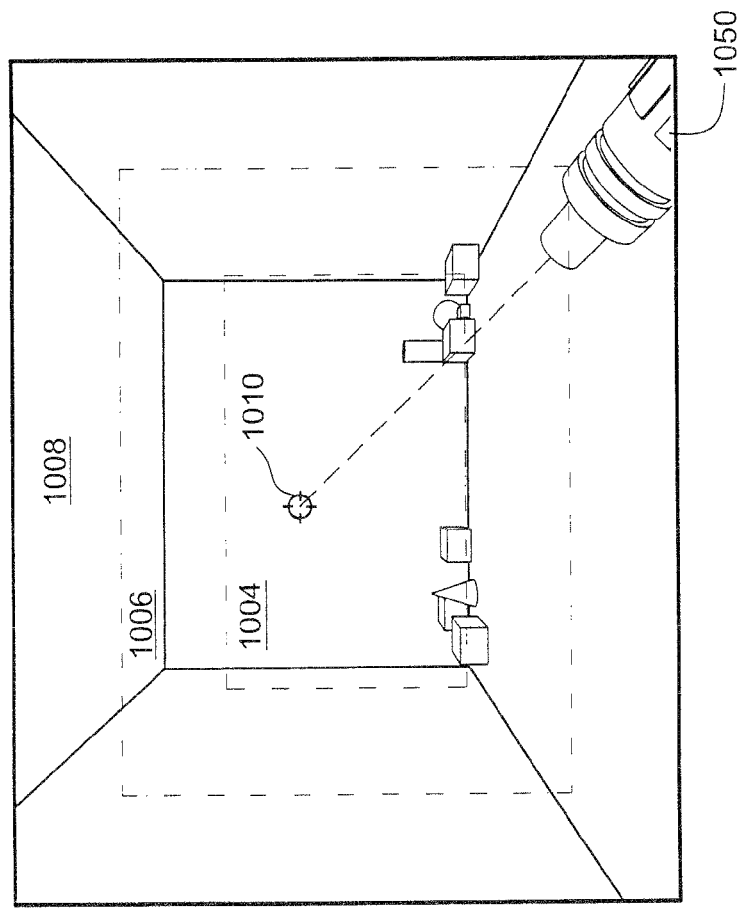
Figure 7D:
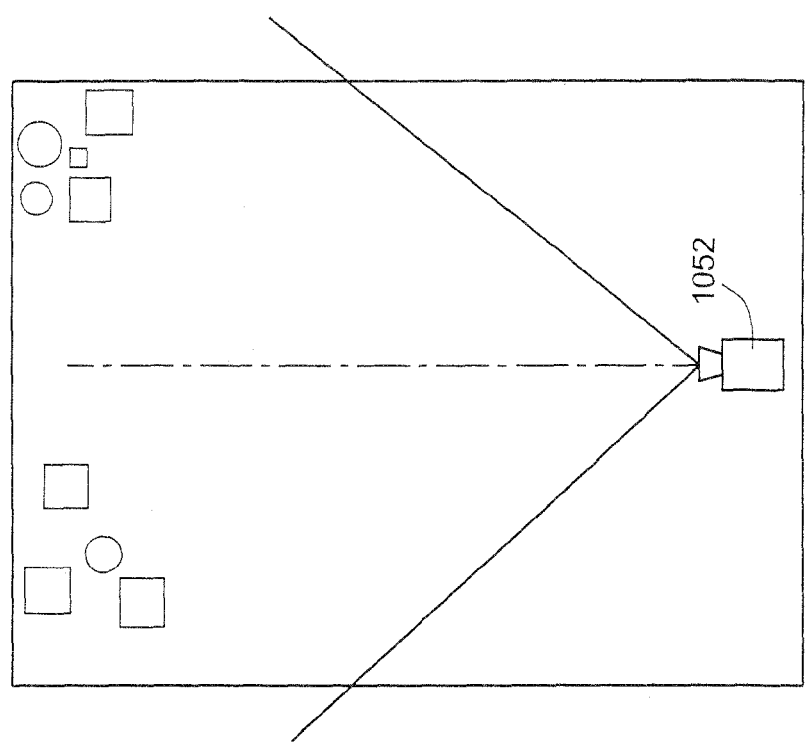
Figure 7C:
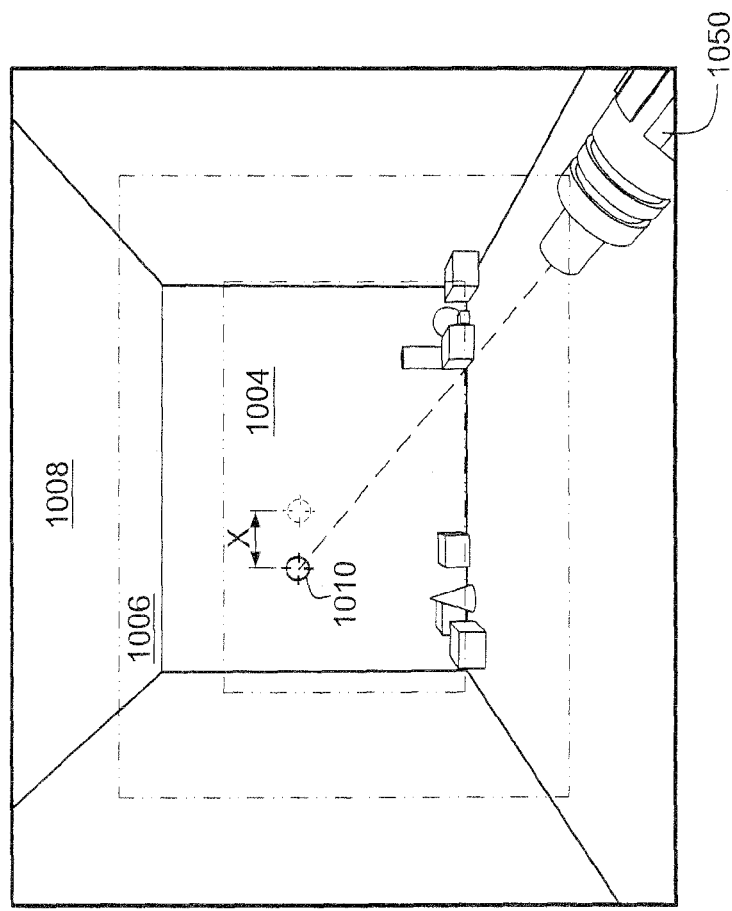

FIG. 6 shows an example illustrative non-limiting screen display 1000 generated by the system described above on a display device 102. Example screen display 1000 shows an example 3-dimensional world 1002—in this case an interior of a building including a window and four walls. The two-dimensional projection of the three-dimensional world 1002 onto the display device 102 is, in the exemplary illustrative non-limiting implementation, divided into three regions or areas:

an innermost area 1004,
a first virtual camera panning control area 1006 surrounding the innermost area 1004, and
an additional virtual camera panning control area 1008 surrounding the virtual camera panning control area 1006.

By way of example and without limitation, these three regions or areas 1004, 1006, 1008 are defined relative to the two-dimensional surface of the display 102. However, in other implementations, these regions or areas could be defined as three-dimensional regions or volumes within the three-dimensional world 1002.

In the exemplary illustrative non-limiting implementation, a cursor is also displayed on the display device 102. This cursor 1010 is displayed at a position that is controlled by the pointing direction of the handheld controller 107 described above. Whenever the game player moves the handheld controller 107 to point in a different direction, the position of cursor 1010 follows that movement and moves to a pointed-to position on the display device 102. In other exemplary illustrative non-limiting implementations, the cursor position might be controlled by a two-dimensional analog or digital joystick, a mouse, a track ball, the position of a stylus or finger on a touch screen, or by any other convenient input or other mechanism.

While the regions 1004, 1006, 1008 are delineated in the FIG. 6 illustration by dotted lines, the actual display seen by the game player or other user may or may not provide an indication of the extent and boundaries of these different regions. In some exemplary illustrative non-limiting implementations, it may be desirable to provide visual cues so the user knows which region the cursor 1010 is currently within. In other exemplary illustrative non-limiting implementations, no such visual cues are provided. In such implementations, audible or other cues could be provide, or possibly no cues might be needed in some applications beyond the panning control described below.

In the exemplary illustrative non-limiting implementation shown in FIG. 6, the cursor 1010 is currently placed, by the handheld pointing device, within the innermost region 1004. Whenever cursor 1010 is within this innermost region 1004 in the illustrative exemplary non-limiting implementation, the virtual camera viewpoint does not change. In one example illustrative non-limiting implementation, moving the position of cursor 1010 anywhere within the innermost region 1004 allows a constant and consistent virtual camera viewpoint to be maintained. This means that perspective of the various objects within the three-dimensional world 1002 does not change, and that which objects can be seen similarly does not change. Rather, when the cursor 1010 is within the innermost region 1004, its position can be moved to control some other aspect of game play—for example, the direction in which a weapon is aimed. For example, in a first person shooter game, moving a cursor 1010 upwardly within a region 1010 may cause a weapon to be tilted upwardly toward the cursor. Similarly, moving the cursor position to the left may cause the direction of the weapon to move to the left and follow the cursor and the like.

In the exemplary illustrative non-limiting implementation, when the user changes the pointing direction of the handheld controller to cause the cursor to move into virtual camera control area 1006, the position of the cursor begins to have an effect on a change in virtual camera viewpoint. In one exemplary illustrative non-limiting implementation, when the user moves the cursor 1010 out of innermost area 1004 and into the virtual camera control area 1006, a depicted weapon may continue to be aimed at the cursor position but at the same time the virtual camera viewpoint may also begin to pan in the direction indicated by the cursor position. Thus, for example, if the user moves the cursor to the right into region 1006, the system may begin to pan the virtual camera viewpoint so as to reveal different portions of the three-dimensional world 1002 to the right of the portions viewed previously.

In one exemplary illustrative non-limiting implementation, the panning may be performed at a rate that is preprogrammed and which does not depend on the rate at which the user is moving cursor 1010. In other words, it is the position of cursor 1010 and not its rate of positional change in this exemplary illustrative non-limiting implementation that activates (and controls the direction of) three-dimensional panning (up, down, left, right, or possibly along a vector defined by current cursor position relative to the center of the screen or any other arbitrary point). In this exemplary illustrative non-limiting implementation, whenever the user moves the cursor 1010 into a rightward portion of virtual camera control area 1006 relative to the center of the screen, the virtual camera viewpoint begins panning to the right at a predetermined rate. Such panning will continue (e.g., to provide a full 360° rotation through the three-dimensional world 1002) so long as the cursor 1010 remains within the virtual camera control area 1006. In a similar manner, whenever the user places the cursor 1010 into a portion of the virtual camera control area 1006 that is above the center of the screen, the system will begin panning the virtual camera viewpoint upwardly. Similar effects to provide leftward panning and downward panning can be achieved by moving the cursor 1010 to a leftward portion of virtual camera control area 1006 or a lower portion of the virtual camera control area, respectively.

In one exemplary illustrative non-limiting implementation, the effect being simulated is that of first person shooter who is turning his or her head or body in the direction of the cursor position. In such implementations, it may be desirable to provide a full 300° of horizontal rotation (to the left or to the right) in order to simulate the first person shooter turning his or her body to the left or to the right. In such an exemplary illustrative non-limiting implementation, the range of the first person shooter's head motion upwardly and downwardly may be limited—just as in the real world, you can bend your neck to look nearly straight down or nearly straight up but not beyond. In other exemplary illustrative non-limiting implementations, such as for example simulating the motion of a space pod with six degrees of unconstrained freedom, the range of panning angles could be 360° in all directions or in any arbitrary direction of rotation, or other limitations could be applied depending on the application.

In some exemplary illustrative non-limiting implementations, there might be only one virtual camera control area which could, for example, be defined as any position outside of the inner area 1004. However, FIG. 6 shows two different virtual camera panning control areas 1006, 1008. Additional virtual camera panning control area 1008 surrounds inner virtual camera control area 1006. In the exemplary illustrative non-limiting implementation shown in FIG. 6, the two different virtual camera control areas 1006, 1008 control the virtual camera to pan at different respective rates. For example, placing the cursor 1010 within the inner virtual camera panning control area 1006 may cause the virtual camera to pan at a relatively slow rate in one exemplary illustrative non-limiting implementation, whereas placing the cursor within the surrounding outer virtual camera panning control area 1008 may cause the virtual camera viewpoint to pan at a faster rate. Any number of virtual camera panning control areas or regions from 1 to N, N being an integer, of any size, shape or configuration can be used. The virtual camera control area(s) can be symmetrical or asymmetrical with respect to the display. For example, in some exemplary illustrative non-limiting implementations, the virtual camera control area to the left and to the right of the center of the display may be wider or relatively large in dimension and much smaller (or even non-existent) in the area to the top or bottom of the display or vice versa. Any desired configuration is possible.

In one exemplary illustrative non-limiting implementation, the user may be given the option of overriding the effect of the virtual camera panning control areas 1006, 1008 by activating a "view lock" mode (e.g., by holding down a button such as the Z button). In such exemplary illustrative non-limiting implementations, such a "view lock" mode can allow the user to move the cursor 1010 anywhere on the screen without causing the virtual camera angle to change. In other exemplary illustrative non-limiting implementations, the user might need to hold down a button or exert some other control in order to activate the virtual camera panning control providing automatic panning whenever the cursor 1010 is positioned within a virtual camera panning control region.

In the effect described above, the virtual camera will continue to pan even when the cursor is held stationary in position within a virtual camera control region 1006, 1008. Given that the exemplary illustrative non-limiting handheld controller may not necessarily be used with a full 360° physical rotation (e.g., because it may, without limitation, be aimed generally toward sensors positioned about the display device), the user may not need to physically rotate the handheld controller about a 360° angle in order to achieve 360° of virtual camera panning. In such example non-limiting implementations, all the user needs to do is to place cursor 1010 within a virtual camera control region 1006, 1008 at a position offset from the center of the display in the direction the user wishes the virtual camera to pan. In such implementations, the system will automatically provide virtual camera panning in the desired direction without the user having to take any additional action.

In the example non-limiting implementation, the user can control the speed at which the virtual camera pans by specifying the distance the cursor is from the center of the display. In the exemplary illustrative non-limiting implementation shown in FIG. 6, there are two different speeds of panning—fast or slow. If the user places cursor 1010 very close to the edge of the display, the virtual camera will pan rapidly. If the user places the cursor 1010 within an inner virtual camera control region 1006 that is not so close to the edge of the display, the virtual camera will continue to pan but at a slower rate, and placing the cursor 1010 in the center region 1004 stops panning altogether. Such an arrangement gives the user the option of being able to simulate a very rapid turn toward an enemy and then more finely adjust his or her rotational orientation, in the context of a first person shooter game or other first person game, using the finer panning control provided by the inner virtual camera control region 1006.

In other exemplary illustrative non-limiting implementations, a variable panning rate could be calculated based for example on the distance of cursor 1010 from the center of the display or from the edge of the display, or based on how far the user has moved the cursor or the speed at which the user moves the cursor.

In still other exemplary illustrative non-limiting implementations, the virtual camera may pan at a rate that is determined by how long the cursor 1010 has been within a virtual camera control region. For example, in one exemplary illustrative non-limiting implementation, when the cursor 1010 is first moved into the virtual camera control region 1006, relatively slow panning begins to occur. The longer the cursor remains within the virtual camera control region 1006, the faster virtual camera panning will occur. In one exemplary illustrative non-limiting implementation, there might be only two speeds (fast and slow) for the virtual camera panning, with a threshold time period (e.g., two seconds) being used to compare with the time period that cursor 1010 has remained within the virtual camera control region. In other exemplary illustrative non-limiting implementations, the calculation could be used to provide a direct proportionality between how long the cursor has remained within the virtual camera control region and the rate at which the virtual camera is panned.

As used herein, the term "panning" is intended to be analogous to the type of panning of a real camera on a tripod with a rotational head. Using a real world movie camera on a tripod, one can turn the camera direction to the left or to the right and can also adjust the camera direction upwards and downwards. Those skilled in the art well know that such panning of a 3-D viewpoint can be accomplished straightforwardly using matrix transformations when generating 3-D perspective or orthogonal views. See for example Foley et al., *Computer Graphics Principles and Practice* (Second Edition 1990, Addison Wesley) at for example section 6.2, pages 237-252. Such panning or other virtual camera control effects are well known and have been widely used in cinematography, animation, simulated dance, 3-D visualization and a wide variety of other contexts. See for example U.S. Pat. No. 6,325,717.

While the exemplary illustrative non-limiting implementation generally does not control the rate at which panning occurs based on the rate at which the user is moving cursor 1010, in other exemplary illustrative non-limiting implementations the rate at which the user moves the cursor could be used as an input to affect or determine the panning rate. Furthermore, while the exemplary illustrative non-limiting implementation uses display of a cursor 1010 to provide an indication to the user as to what type of panning effect the user might expect, other implementations could display an object other than a cursor or might display no object at all and simply rely on the user knowing the direction or position he or she is pointing at (e.g., based upon the physical position of the handheld pointing device), or other type of feedback such as audio, touch, or visual feedback could be used.

In one exemplary illustrative non-limiting implementation, the cursor 1010 is controlled through the DPD optical pointing device 107 to point to game objects or change viewing direction. When the cursor 1010 is within "area I" (1004) of the game display, no scrolling occurs, i.e., you can freely and easily point any objects that exist around the center of the display. When the cursor 1010 is in "area II" of the game display, slow scrolling occurs, i.e., you can see around the game space including the wall behind the original viewpoint. When the cursor 1010 is in "area III" of the game display (1008), fast scrolling occurs.

FIGS. 7A-9B further illustrate the exemplary illustrative non-limiting implementation described above. When the cursor is within the inner region 1004, a virtual weapon 1050 may be aimed at and follow the cursor position without a virtual camera 1052 changing its viewing direction. In this instance, by way of example without limitation, the user can freely move the cursor 1010 anywhere within the inner region 1004 without the virtual camera 1052 changing position. See FIGS. 7A and 7B. Thus, for example, referring to FIG. 7C, if the user moves the cursor 1010 slightly to the left while still remaining within the inner region 1004, the direction of virtual camera 1054 does not change (as illustrated in FIG. 7B).

Figure 8B:
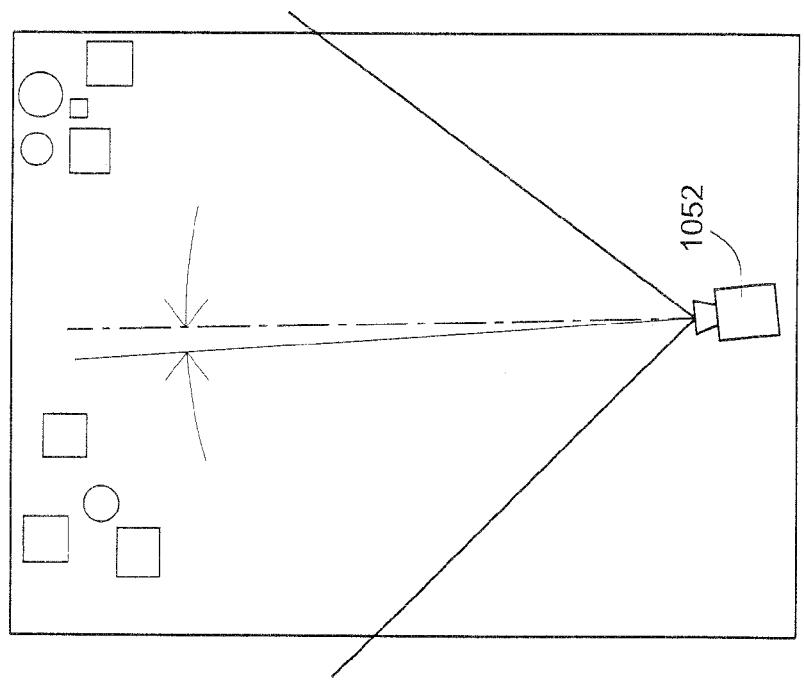
FIGS. 8A and 8B show an exemplary cursor position that initiates slow camera panning.
Figure 8A:
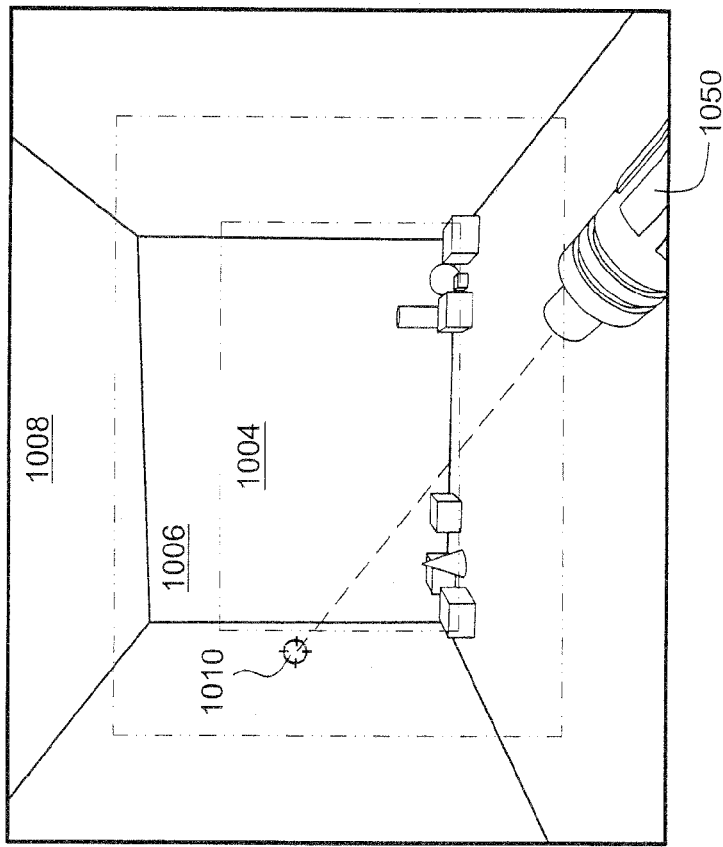

As illustrated in FIGS. 8A and 8B, if the user moves the cursor 1010 so that it leaves the inner region 1004 and enters the inner cursor control region 1006, the system automatically begins controlling the virtual camera 1052 to pan slowly in a direction corresponding to the position of cursor 1010.

Figure 9B:
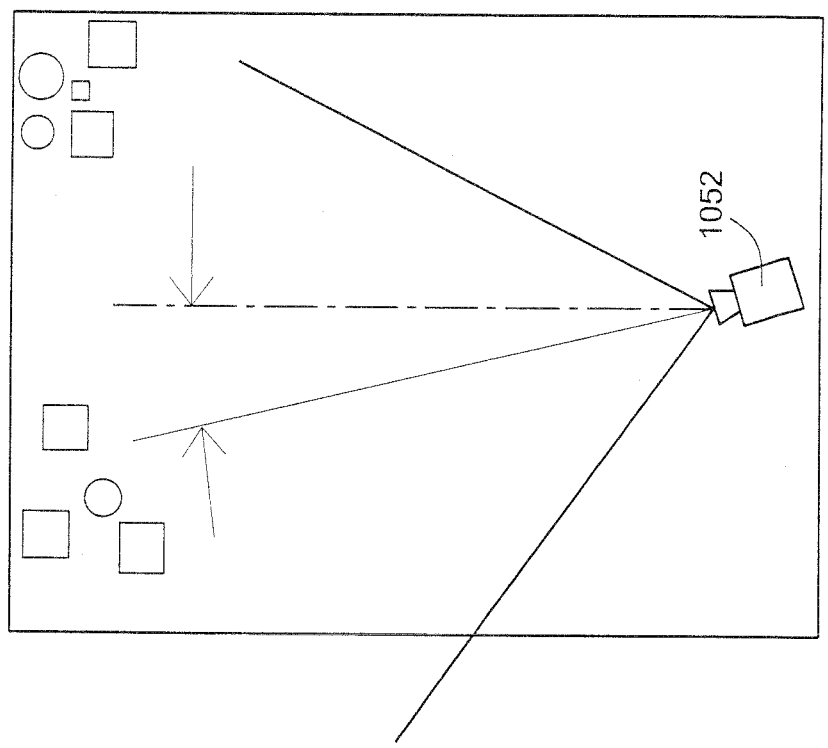
FIGS. 9A and 9B show an exemplary cursor position that initiates more rapid camera panning.
Figure 9A:
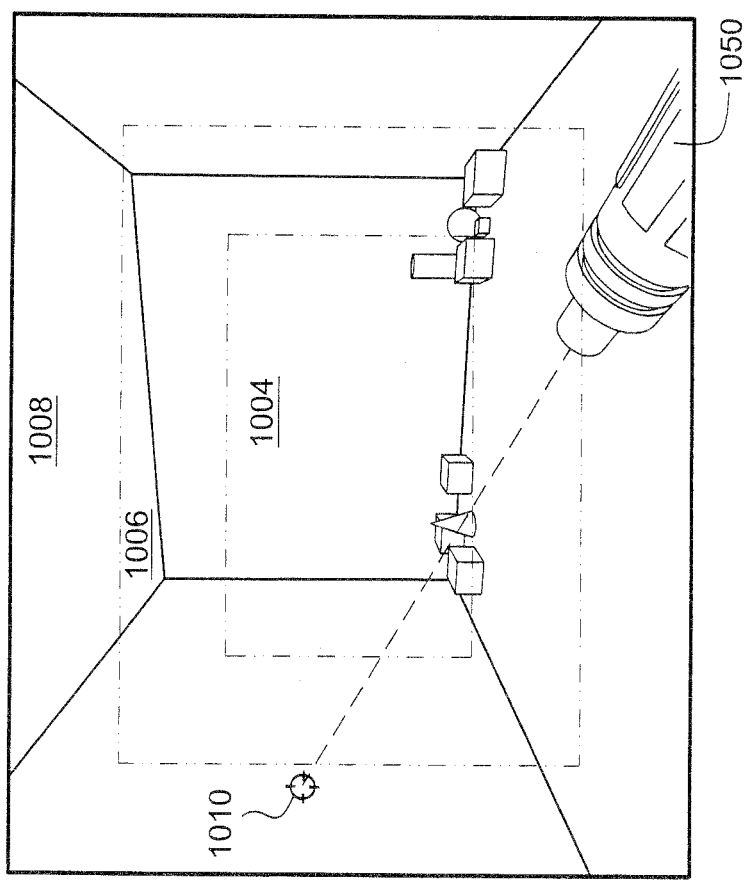

As shown in FIGS. 9A and 9B, if the user changes the position of cursor 1010 so that it leaves the inner cursor control region 1006 and enters the outer, surrounding cursor control region 1008, then the system increases the rate at which the virtual camera 1054 pans in a direction corresponding to the cursor position 1010.

Figure 10:
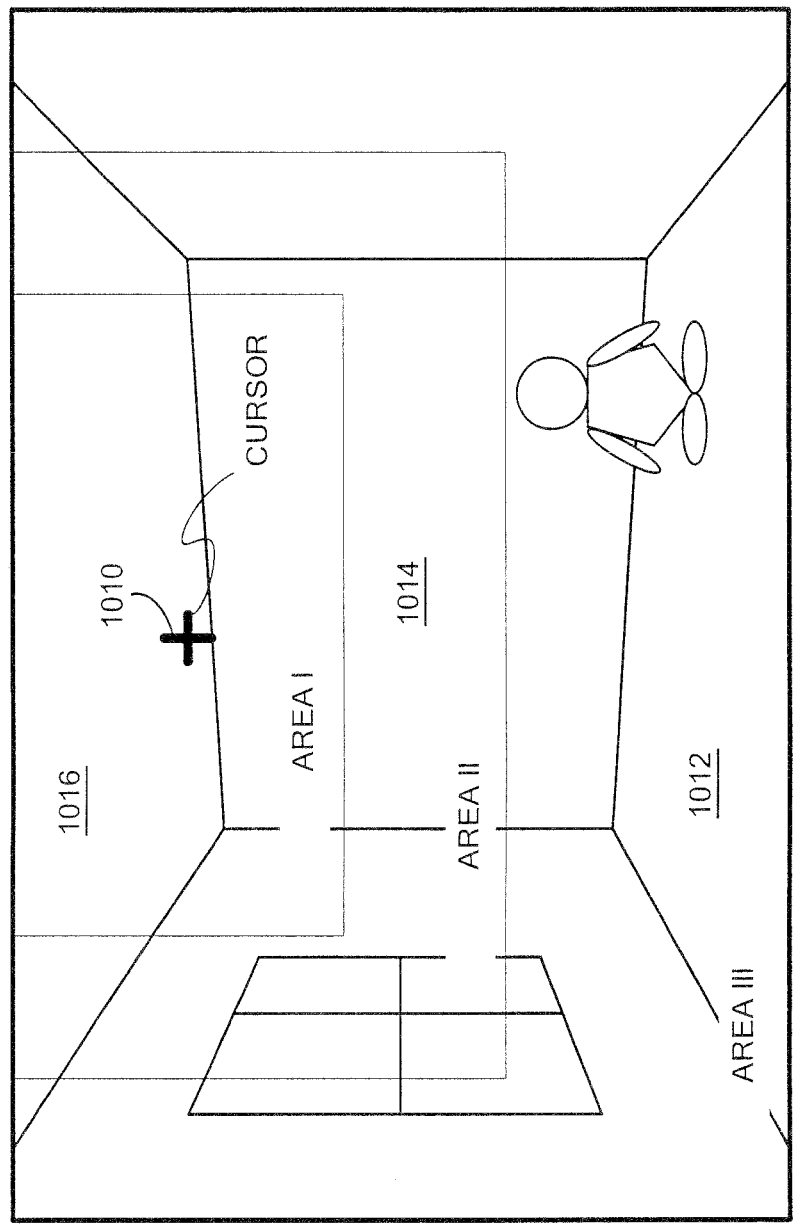
FIG. 10 shows an alternative exemplary illustrative non-limiting camera panning region arrangement.

As mentioned above, the panning control regions can be any size, shape or configuration. FIG. 10 shows an alternative exemplary illustrative non-limiting implementation providing a virtual camera panning control region 1016 within the upper portion of the display, a surrounding virtual camera panning control region 1014 in approximately the upper half of the display, and a further region 1012 covering the remaining portion of the display. In this exemplary illustrative non-limiting implementation, when the cursor 1010 position changed, areas 1012, 1014, 1016 also change their positions and size following the movement of the cursor. In this example, when the cursor 1010 exists above the zone of the display, the area 1016 and 1014 also move to the above area of the display and the size is reduced. This feature brings easy and comfortable control of the 3D game. When the user wants to point at a moving target displayed in the upper edge area of the display for shooting, for example, the user would point to the upper portion of the display. However if the area 1016 remains the same as shown in FIG. 6, the game display image would turn around rapidly and it might become hard to point at the exact target. In this alternative exemplary illustrative non-limiting implementation, the sizes and coverages of the various areas 1016, 1014, 1012 are dynamically changed with cursor position so that the user can point to any target with smooth panning and a good feeling of control.

Exemplary Illustrative Non-Limiting Software Control

Figure 11:
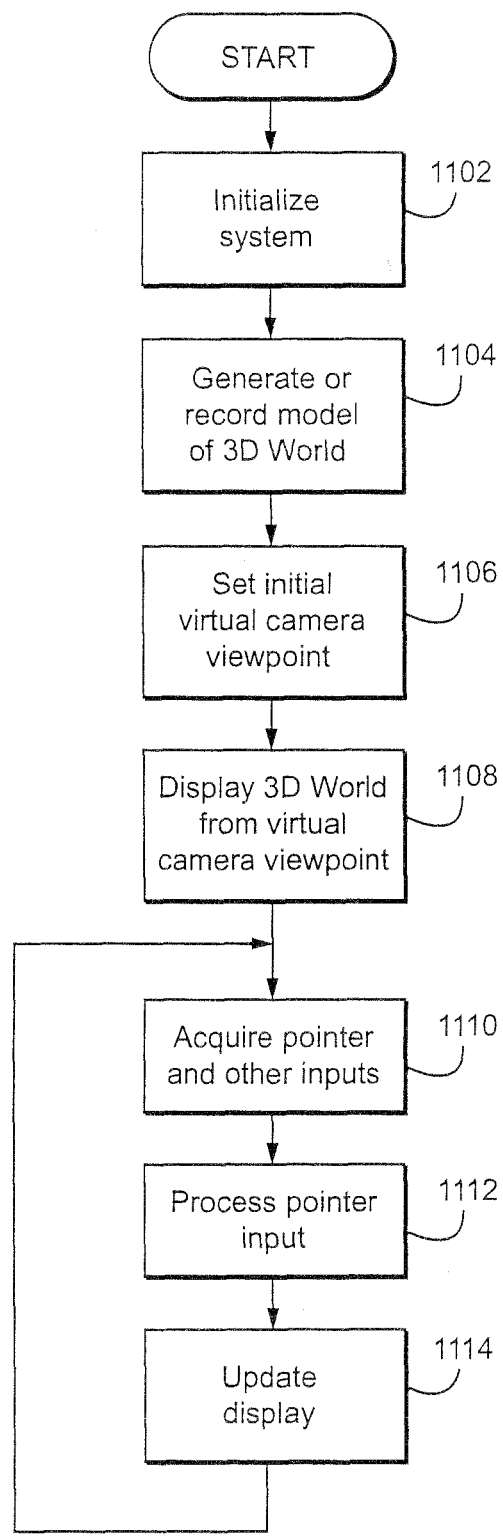
FIGS. 11-14 show example illustrative non-limiting flowcharts.

FIG. 11 shows a flowchart of an exemplary illustrative non-limiting implementation of game or other software that may be stored on a storage device such as an optical disk and run on the system described above in connection with FIGS. 1-5 to provide the panning functionality described above. In the example shown, the software initializes the hardware (block 1102) and then generates and/or reads a model of the three-dimensional world (block 1104). The software then sets an initial virtual camera viewpoint (block 1106) and displays the 3-D world from the initial virtual camera viewpoint (block 1108) to provide a display such as shown above in FIG. 6 or 7A. The exemplary illustrative non-limiting implementation then acquires optical pointing and other inputs (block 1110) and processes the pointing input (block 1112) in order to animate the displayed image and, if necessary, change the virtual camera viewpoint (block 1112). The system updates the display at a suitable rate (block 1114) to provide real time interactive animation effects.

Figure 12:
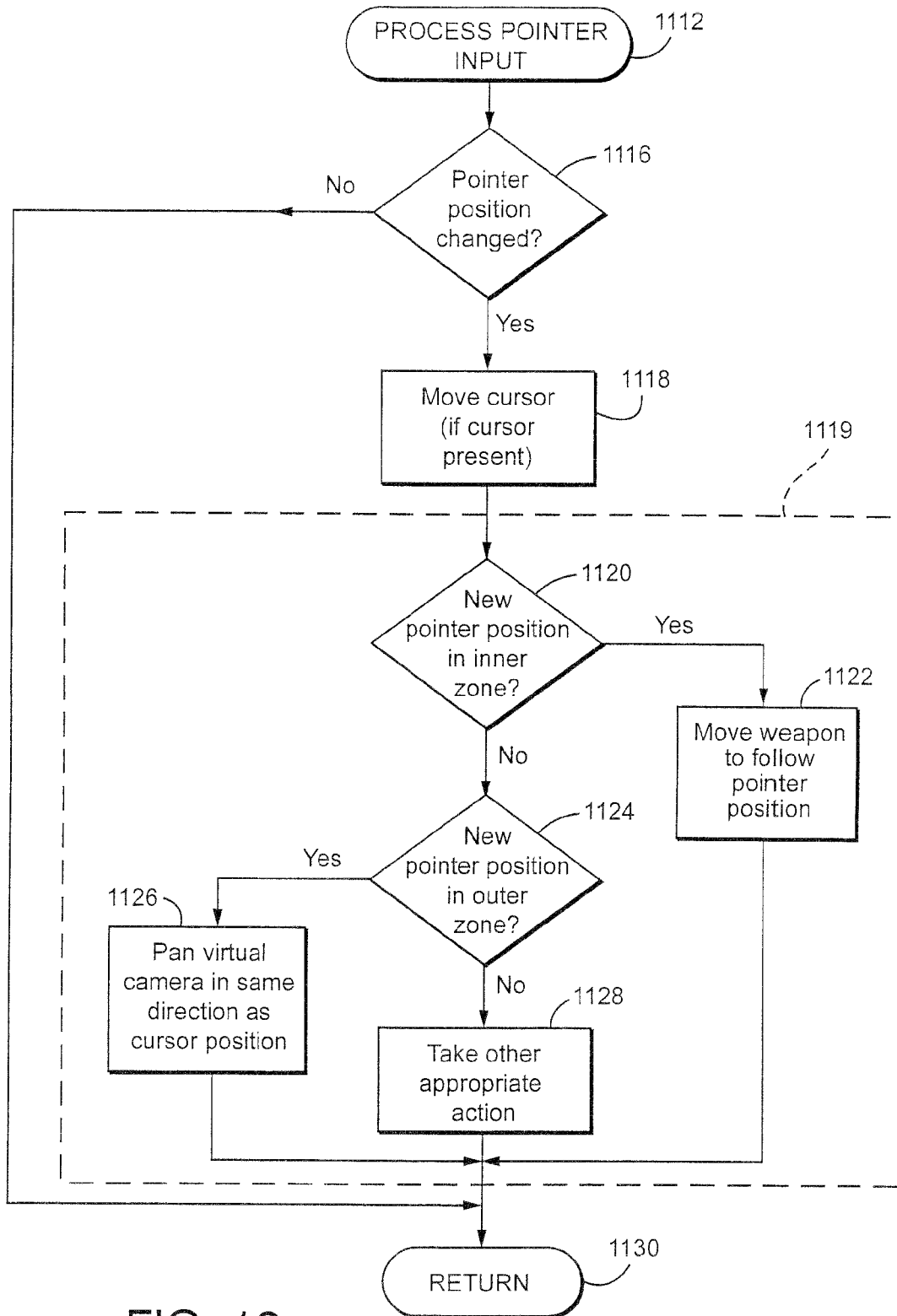

FIG. 12 shows an exemplary illustrative non-limiting process pointer input routine 1112. In this exemplary illustrative non-limiting implementation, the system determines whether the pointer position has changed (block 1116). If it has not changed, control may return (block 1130). If the pointer position has changed ("yes" exit to decision block 1116), the system may move the position of the cursor 1010 (if a cursor is being used) (block 1118). The system may then execute or perform functionality 1119 that compares the position of the cursor with predetermined regions on the display in order to take appropriate action. In the exemplary illustrative non-limiting implementation shown in FIG. 12, the system determines whether the new pointer position is within the inner zone 1004 described above (block 1120). If it is ("yes" exit to decision block 1120), the system may then animate the image of a weapon to follow the pointer position without changing the virtual camera viewpoint (block 1122). If, on the other hand, the system determines that the new pointer position is not within the inner zone 1004, the system may determine whether the new pointer is within an outer zone e.g., 1006, 1008 (decision block 1124). If the new cursor position 1010 is within the outer zone (block 1006, 1008), the system may pan the virtual camera in a direction corresponding to the new cursor position 1010 (in the same direction as the cursor position) and at a rate that is predetermined but which may depend upon precisely where on the display the cursor 1010 currently resides (block 1126). In some exemplary illustrative non-limiting implementations, the pointing device might point in a direction that is different from either of these regions, in which case other appropriate action might be taken (block 1128).

Figure 13:
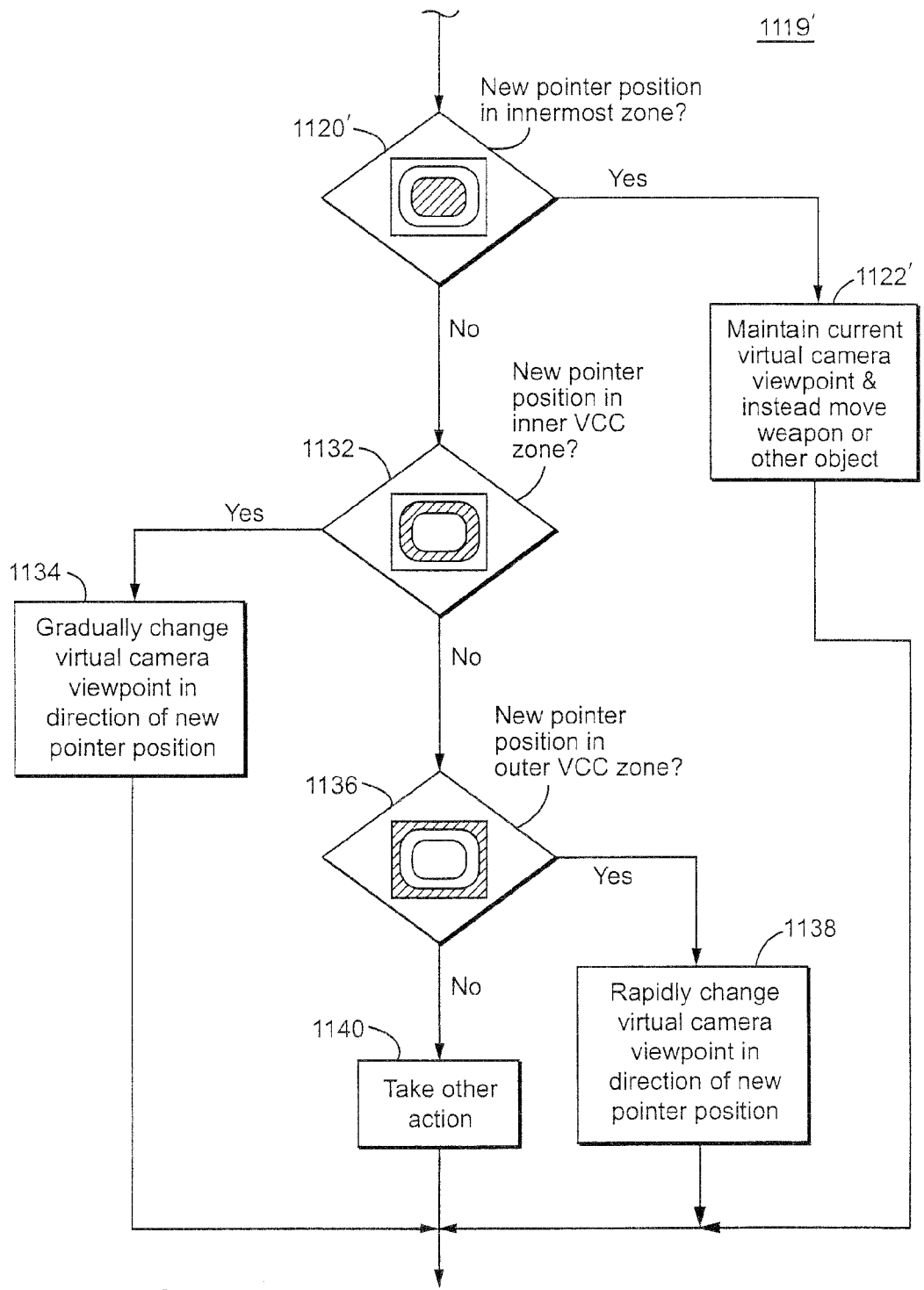

FIG. 13 shows an exemplary illustrative non-limiting alternative implementation of the functionality 1119 to provide for two different virtual camera control regions 1006, 1008 providing two respective different rates of virtual camera panning. In this particular exemplary illustrative non-limiting implementation, if a new cursor position is in the inner virtual camera control zone (decision block 1132), then the system gradually changes (pans) the virtual camera viewpoint in the direction of the new cursor position (block 1134). If, in contrast, the new cursor position is in the outer virtual camera control zone 1008, then the system rapidly changes (pans) the virtual camera viewpoint in the direction of the new cursor position (block 1138).

Figure 14:
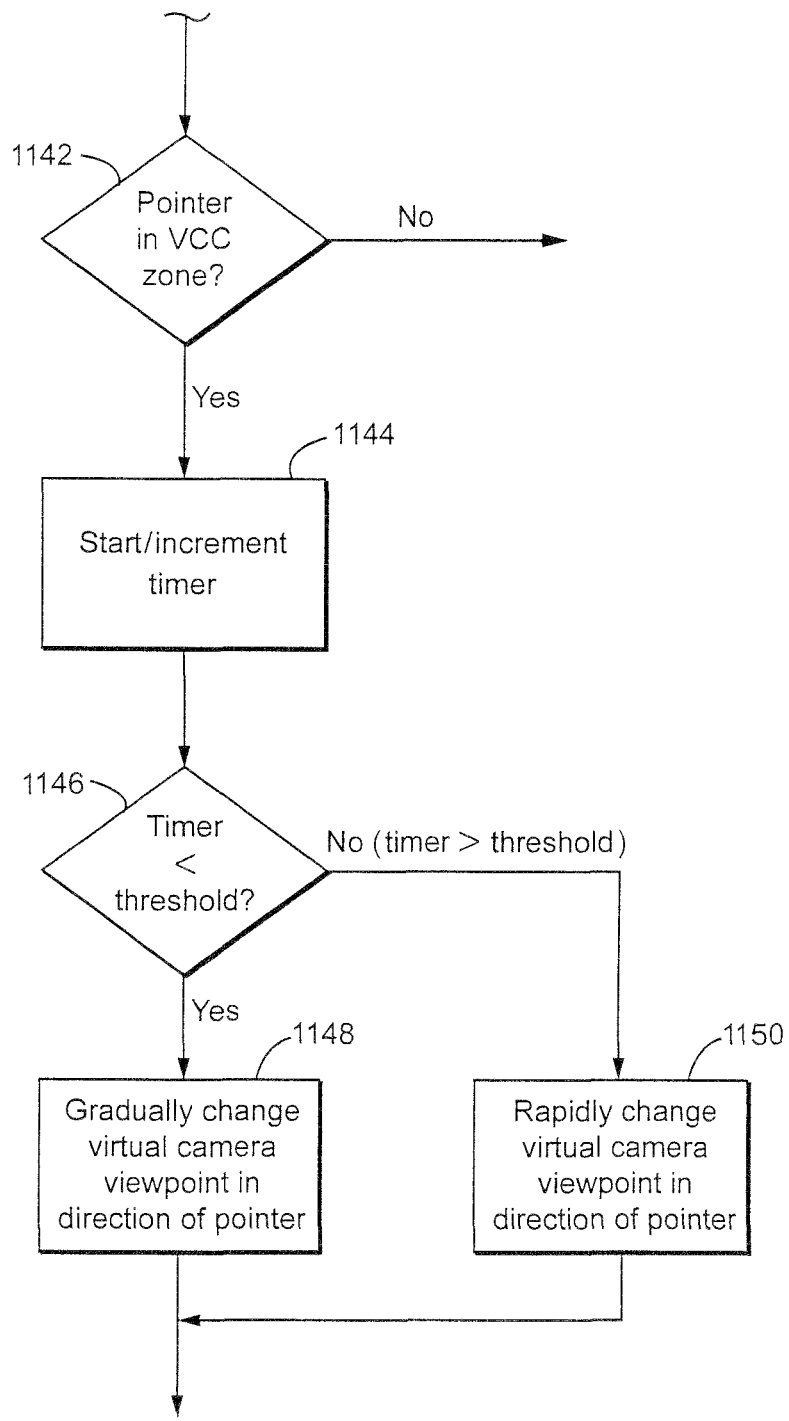

FIG. 14 shows a still additional exemplary illustrative non-limiting implementation using time encoding to control panning rate. In this exemplary illustrative non-limiting implementation, if the pointer is in the virtual control zone (decision block 1142), then the system starts and/or increments a timer (block 1144). If the timer is less than a certain threshold in one exemplary illustrative non-limiting implementation (decision block 1146), then the system gradually changes (pans) the virtual camera viewpoint in the direction of the cursor (block 1148). If the timer is greater than a threshold—meaning that the cursor position has remained in the virtual camera panning control zone for more than this time threshold—the system rapidly changes the virtual camera viewpoint in the direction of the current position of the cursor (block 1150).

Example Game Displays

Figure 15A:
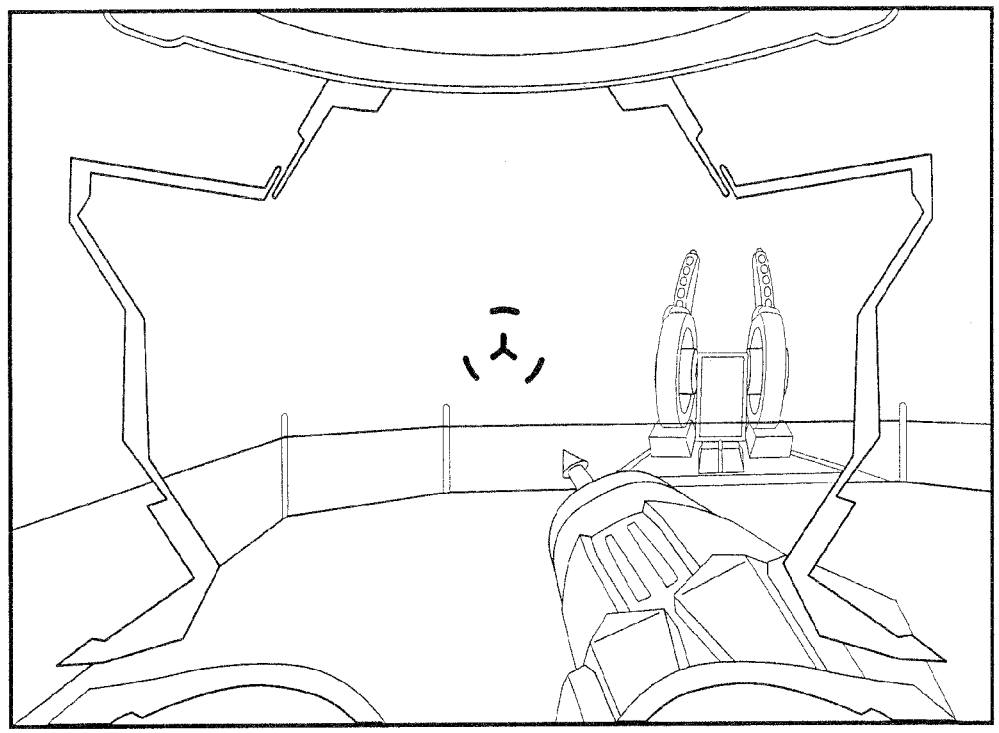
FIGS. 15A-15C show exemplary illustrative non-limiting video game screen displays.
Figure 15B:
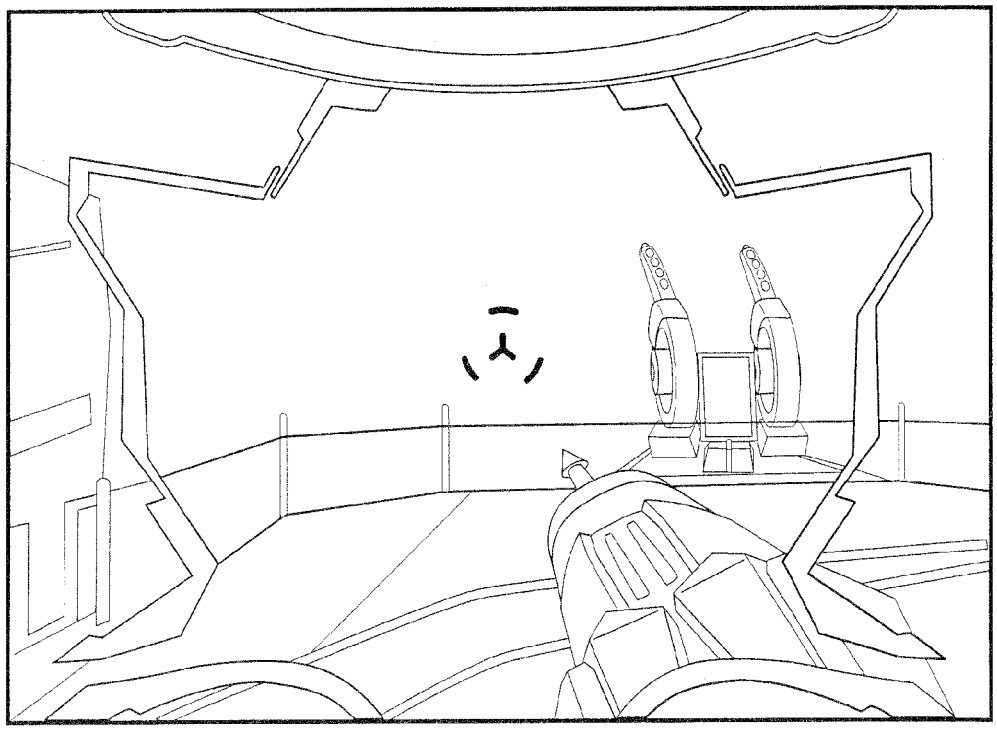
Figure 15C:
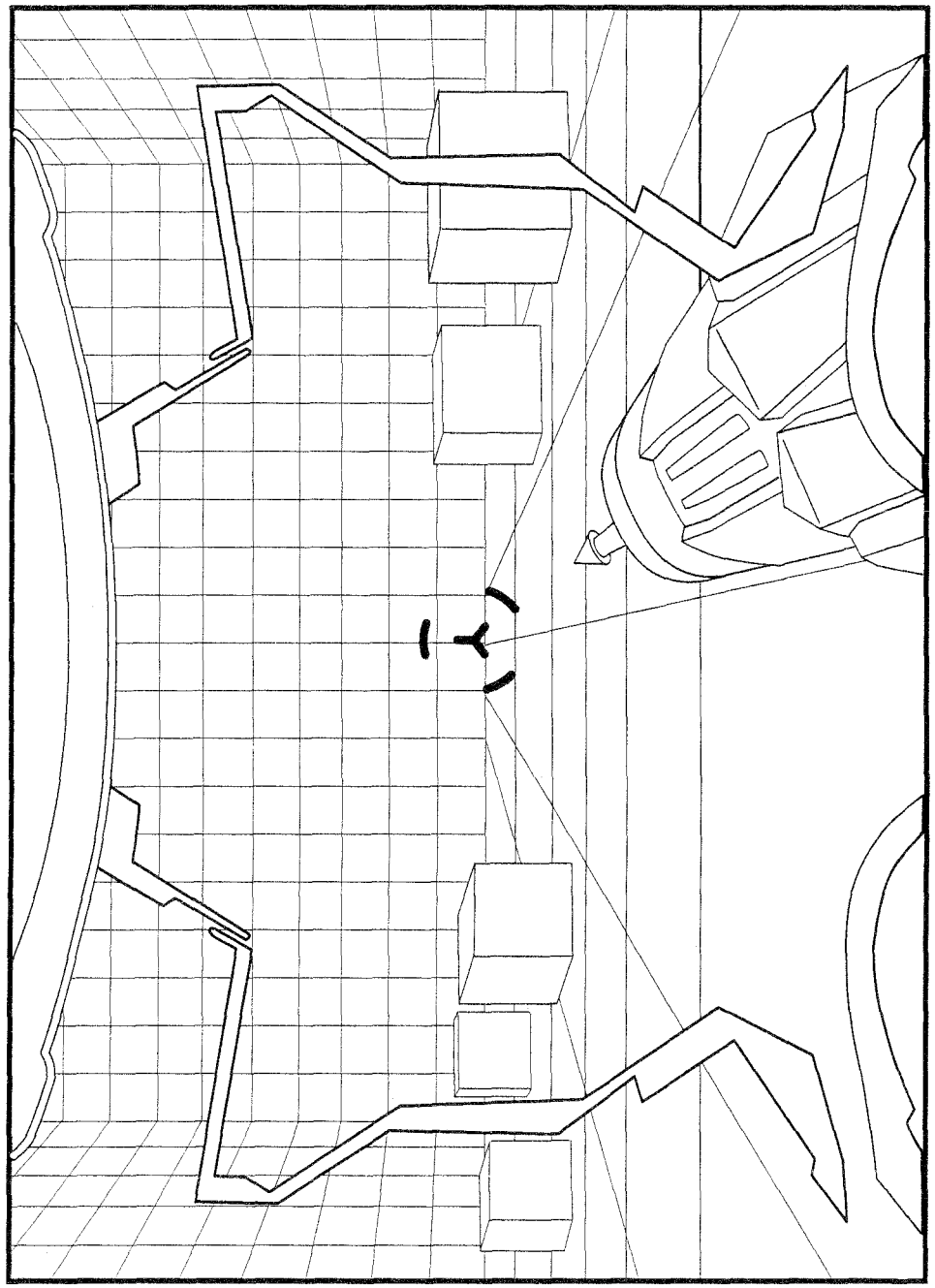

FIGS. 15A, 15B, 15C show example screen shots of an actual video game using the techniques described herein. In this exemplary illustrative non-limiting implementation, a first person shooter game is implemented in which the character wears a visor the image of which can be seen on the displays. The visor may roughly delineate the inner region 1004 within which the cursor will not cause the virtual camera to pan. Equating the virtual camera panning control region(s) 1006 to be areas surrounding the visor viewing area provides a sense of realism since the first person shooter character does not need to turn her head or rotate her body in order to see and shoot at any enemies that are visible within the visor area. In this exemplary illustrative non-limiting implementation, whenever the user moves the cursor so that it is outside of the visor area, the virtual camera begins to pan in a direction that corresponds to the offset of the cursor relative to the center of the display. Furthermore, the closer the cursor position is to the edge of the display screen, the faster panning will occur. In the exemplary illustrative non-limiting implementation, a full 360° of horizontal panning is provided whereas vertical panning is only provided within a 180° range in order to simulate what a real world user would be able to see by turning his or her head, craning it upward, looking downward or turning his or her body around.

While the technology herein has been described in connection with exemplary illustrative non-limiting implementations, the invention is not to be limited by the disclosure. For example, while the technology above has been described in connection with 3D virtual camera panning, other types of 2D or 3D viewpoint control could be used instead. While the exemplary illustrative non-limiting implementation provides first person shooter type game play on a home video game machine, any type of computer graphics or other computing platform could be used to play any type of game or provide any type of graphical, virtual reality or other display. The invention is intended to be defined by the claims and to cover all corresponding and equivalent arrangements whether or not specifically disclosed herein.

I claim:

1. A method of allowing a video game user to both (a) target a location in a three-dimensional (3D) virtual world and (b) pan a view presented from a virtual camera in a desired direction to reveal additional portions of the 3D virtual world with a three-dimensional video game computer graphics display system that includes at least one processor, the method comprising:
displaying, on a display in a display area, an image of the 3D virtual world viewed through the virtual camera that has a viewing orientation;
defining the display area as having an inner region and an outer region;
accepting a user provided input that indicates a position within the display area;
controlling a targeting position on said display that is at least in part responsive where the user input indicates within the display area, said targeting position indicating a location within the 3D virtual world;
determining that the controlled targeting position is located within the inner region or the outer region;

targeting different locations within the 3D virtual world without panning the virtual camera when the targeting position is located within the inner region; and panning, via the at least one processor, the virtual camera to a different viewing orientation to reveal additional portions of the 3D virtual world for display on the display area in accordance with determination that the controlled targeting position is located within the outer region while concurrently targeting different locations within the 3D virtual world, where the virtual camera is controlled to not pan based on determination that the controlled targeting position is located within the inner region and/or not within the outer region.

2. The method of claim 1, further comprising controlling a rate that the virtual camera is panned based on a distance between a center point of the display and the controlled targeting position.

3. The method of claim 1, further comprising controlling a rate that the virtual camera is panned based on how long the controlled targeting position remains within the outer region.

4. The method of claim 1, further comprising:
subdividing the outer region into a plurality of control regions; and
controlling a panning rate based at least in part on which of said plurality of control regions the controlled targeting position is within.

5. The method of claim 1, further comprising
display a weapon targeting marker in accordance with the controlled targeting position;
displaying a weapon targeting reticle image, wherein said weapon targeting reticle image at least in part comprises said inner region and includes the weapon targeting marker.

6. The method of claim 1, further comprising controlling a direction that the virtual camera is panned based at least in part on the controlled targeting position relative to a reference point.

7. The method of claim 1, wherein the user input is provided via a touch screen display device.

8. A non-transitory computer readable storage medium storing computer readable instructions for targeting positions within a three dimensional virtual world and adjusting a virtual camera, the stored instructions comprising instructions that are configured to:
output, to a display area on a display device, an image of a presented scene of the three dimensional virtual world viewed through the virtual camera that is positioned within the a three dimensional virtual world and oriented in a viewing direction;
set the display area into a first region and a second region that is different from the first region;
accept a first user input operation that is performed by a user via an input device within the first region, the first user input operation indicating at least a first position and a second position that is different from the first position within the display area on the display device, the first and second positions both corresponding to at least one respective location within the three dimensional virtual world;
maintain the presented scene of the three dimensional virtual world as viewed through the virtual camera in accordance with a determination that the first user input operation performed by the user is within the first region, maintenance of the presented scene including maintaining the position and the viewing direction of the virtual camera;
receive a second user input operation that is performed in the second region by the user via the input device, the second user input operation indicating at least a third position that corresponds to at least one location within the three dimensional virtual world;
determine that the second user input operation is within the second region;
adjust the virtual camera from the presented scene of the three dimensional virtual world as viewed through the virtual camera to a newly presented scene in accordance with the determination that the second user input operation is within the second region, the adjustment to reveal additional portions of the three dimensional virtual world; and
output, to the display area on the display device, an image of the newly presented scene.

9. The medium of claim 8, wherein the first region and/or the second region are dynamically resizable and re-locatable in relation to a currently indicated position on the position of a targeting reticle on the display.

10. The medium of claim 8, wherein the instructions are further configured to control a rate that the virtual camera is adjusted based on a distance between a center point of the display device and/or display area and a current position indicated by the user.

11. The medium of claim 8, wherein second region is an outer region surrounds the first region that is an inner region.

12. The medium of claim 8, wherein the adjustment of the virtual camera to the newly presented scene is based at least in part on a reference position relative to the at least a portion of the second user input operation.

13. The medium of claim 8, wherein the input device is a touch screen device that accepts input from a digit of a user and/or an instrument operated by the user.

14. The medium of claim 8, wherein the adjusted virtual camera includes changing a viewing direction of the virtual camera.

15. A computing system for providing a user with panning and targeting control, the system comprising:
a display device configured to display images to a user;
a user input device configured to receive input from a user indicating a position on the display device; and
a processing system that includes at least one processor, the processing system configured to:
output, to a display area on the display device, an image that is based at least in part on a view provided from a camera that is oriented in a viewing direction;
segment the display area of the display device into an inner region of the display area and an outer region of the display area;
accept a first user input operation performed by a user via the input device within the inner region, the first user input operation indicating at least a first position and a second position that is different from the first position within the display area on the display device, the first and second positions both corresponding to at least one respective location within the view provided by the camera that is oriented in the viewing direction;
maintain the viewing direction of the camera in accordance with a determination that the first user input operation performed by the user is located within the inner region and/or not the outer region;
accept a second user input operation performed in the outer region by the user via the input device, the second user input operation indicating at least a third position that corresponds to at least one indicated location within the view presented by the camera;

determine that the second user input operation is within the outer region; and pan the viewing direction of the camera to a new viewing direction in accordance with the determination that the second user input operation is within the outer region.

16. The computing system of claim 15, wherein the computing system is a mobile computing system that is designed for mobile use by the user.

17. The computing system of claim 15, wherein the camera is a virtual camera and the view is of a virtual three-dimensional world.

18. The computing system of claim 15, wherein the processing system is further configured to control a rate that the camera is panned based on a distance between a center point of the display device and/or display area and a position indicated by the user.

19. The computing system of claim 15, wherein the processing system is further configured to control the camera in a view-lock mode that causes the viewing direction to remain stationary regardless of the position indicated on the display device by the user.

20. The computing system of claim 15, wherein the processing system is further configured to dynamically resize and/or relocate the inner region and/or the outer region in response to user input.

21. A method of targeting a location in a three-dimensional (3D) virtual world and panning a view presented from a virtual camera using a computer graphics display system that includes at least one processor, the method comprising:

using the processor, displaying, on a display area, a 3D virtual world as viewed through the virtual camera;

accepting user provided pointing input that indicates a position(s) within the display area;

controlling a targeting position on said display in correspondence with where the accepted user provided pointing input indicates within the display area, said targeting position capable of indicating targeted objects within the 3D virtual world;

selectively determining whether the targeting position that is responsive to the user pointing input is within a first region on the display or a second region on the display;

targeting different objects within the 3D virtual world without panning the virtual camera, where control of the panning of the virtual camera is based on a determination that the targeting position is positioned within the first region on the display;

targeting different objects within the 3D virtual world while also panning the virtual camera in response to determination that the targeting position is positioned within the second region on the display that is different from the first region, to thereby pan the virtual camera to reveal additional portions of the 3D virtual world for display on the display area.

* * * * *